US012630414B2

(12) United States Patent
Duensing et al.

(10) Patent No.: US 12,630,414 B2
(45) Date of Patent: May 19, 2026

(54) SYSTEMS FOR TRANSFERRING A FLUID TO AND/OR FROM A VESSEL AND PROCESSES FOR USING SAME

(71) Applicant: SOFEC, INC., Houston, TX (US)

(72) Inventors: Martin Matthew Duensing, Cypress, TX (US); Arun Sanjay Duggal, Houston, TX (US); Asis Nandi, Houston, TX (US); Rathipriya Narayanan, Pearland, TX (US)

(73) Assignee: MODES AMERICA, INC., Houston, TX (US)

( * ) Notice: Subject to any disclaimer, the term of this patent is extended or adjusted under 35 U.S.C. 154(b) by 127 days.

(21) Appl. No.: 18/356,065

(22) Filed: Jul. 20, 2023

(65) Prior Publication Data

US 2024/0025731 A1     Jan. 25, 2024

Related U.S. Application Data

(60) Provisional application No. 63/391,151, filed on Jul. 21, 2022.

(51) Int. Cl.
B63B 21/50          (2006.01)
B63B 27/34          (2006.01)
(Continued)

(52) U.S. Cl.
CPC ................ B67D 9/02 (2013.01); B63B 27/34 (2013.01); B65G 67/62 (2013.01); B65G 2814/0397 (2013.01)

(58) Field of Classification Search
CPC ..... B63B 22/021; B63B 27/34; B63B 21/507; B63B 22/026; B67D 9/02; B65G 67/62; B65G 2814/0397
See application file for complete search history.

(56) References Cited

U.S. PATENT DOCUMENTS 3,372,410 A * 3/1968 Hindman ............ E21B 41/0071
                                                            441/14
3,479,673 A * 11/1969 Manning ............... B63B 22/021
                                                            114/264

(Continued)

FOREIGN PATENT DOCUMENTS

CN        110435820 A     11/2019
GB          1500384 A      2/1878

OTHER PUBLICATIONS

International Search Report and Written Opinion of the International Searching Authority dated Nov. 24, 2023, for PCT/US2023/070633.

*Primary Examiner* — Edwin J Toledo-Duran
(74) *Attorney, Agent, or Firm* — Edmonds & Cmaidalka, P.C.

(57)          ABSTRACT

Fluid transfer systems and processes for using same. In some embodiments, the system can include a mooring structure, a fluid swivel disposed on the mooring structure, and first and second subsea conduits configured to provide fluid communication between first and second pipelines and first and second flow paths defined by the swivel, respectively. The system can also include first and second surface conduits that can provide fluid communication between a vessel storage tank and the first and second flow paths defined by the swivel, respectively. The system can also include a crossover conduit configured to provide fluid communication between (i) the first and second surface conduits, (ii) the first and second subsea conduits, or (iii) the first subsea conduit and an optional third pipeline. The system can transfer a fluid having a boiling point that is less than an ambient temperature at atmospheric pressure to or from the storage tank.

24 Claims, 13 Drawing Sheets

(51) Int. Cl.
  *B65G 67/62*        (2006.01)
  *B67D 9/02*        (2010.01)

(56) References Cited

U.S. PATENT DOCUMENTS

| | | | | |
|---|---|---|---|---|
| 3,525,312 | A * | 8/1970 | Beck | B63B 3/08 |
| | | | | 114/256 |
| 3,602,302 | A * | 8/1971 | Kluth | E21B 43/017 |
| | | | | 166/336 |
| 3,605,668 | A * | 9/1971 | Morgan | B63B 22/023 |
| | | | | 441/3 |
| 3,641,602 | A * | 2/1972 | Flory | B63B 22/021 |
| | | | | 441/5 |
| 3,708,811 | A * | 1/1973 | Flory | B63B 22/021 |
| | | | | 441/5 |
| 3,825,045 | A * | 7/1974 | Bloomquist | B67D 7/54 |
| | | | | 141/351 |
| 3,913,157 | A * | 10/1975 | Versluis | B63B 22/021 |
| | | | | 242/390.4 |
| 3,945,066 | A * | 3/1976 | Davies | B63B 22/021 |
| | | | | 441/5 |
| 4,030,435 | A * | 6/1977 | Sensibar | B63B 35/306 |
| | | | | 114/36 |
| 4,042,990 | A * | 8/1977 | Donaldson, Jr. | B63B 22/021 |
| | | | | 441/5 |
| 4,142,742 | A * | 3/1979 | Cornett | F16L 39/04 |
| | | | | 285/123.1 |
| 4,234,216 | A * | 11/1980 | Swanson | B63B 22/021 |
| | | | | 285/94 |
| 4,250,918 | A * | 2/1981 | Tuson | B63B 27/24 |
| | | | | 137/580 |
| 4,261,398 | A * | 4/1981 | Haley | B67D 9/02 |
| | | | | 141/387 |
| 4,280,720 | A * | 7/1981 | Lomenech | F16L 39/06 |
| | | | | 285/121.5 |
| 4,310,937 | A * | 1/1982 | Karl | B63B 22/021 |
| | | | | 441/5 |
| 4,558,890 | A * | 12/1985 | Schartz | F16L 39/04 |
| | | | | 285/94 |
| 4,637,336 | A * | 1/1987 | Engelskirchen | B63B 22/021 |
| | | | | 441/5 |
| 4,665,855 | A * | 5/1987 | Delamare | B63B 22/021 |
| | | | | 114/230.14 |
| 4,759,573 | A * | 7/1988 | Delamare | B67D 9/00 |
| | | | | 285/121.6 |
| 5,205,768 | A * | 4/1993 | Pollack | B63B 21/50 |
| | | | | 114/230.1 |
| 5,288,253 | A * | 2/1994 | Urdshals | B63B 22/023 |
| | | | | 114/230.26 |
| 5,755,531 | A * | 5/1998 | Ribas Ferreira | B63B 21/507 |
| | | | | 166/359 |
| 6,742,308 | B1 * | 6/2004 | Johnstone, III | E04B 1/3465 |
| | | | | 52/220.8 |
| 7,107,725 | B2 * | 9/2006 | Johnstone, III | H01R 39/64 |
| | | | | 52/220.8 |
| 10,899,602 | B1 | 1/2021 | Liu et al. | |
| 2008/0056826 | A1* | 3/2008 | Luppi | B63B 22/021 |
| | | | | 405/170 |
| 2010/0178819 | A1* | 7/2010 | Straume | B63B 21/04 |
| | | | | 441/5 |
| 2011/0110724 | A1* | 5/2011 | Baylot | B63B 21/508 |
| | | | | 405/224 |
| 2013/0032072 | A1* | 2/2013 | Dupont | F16C 19/50 |
| | | | | 114/230.12 |
| 2015/0166148 | A1* | 6/2015 | Liu | B63B 27/24 |
| | | | | 137/15.09 |
| 2017/0096193 | A1* | 4/2017 | Eide | F16L 17/035 |
| 2019/0162336 | A1* | 5/2019 | Andersen | G01L 1/242 |
| 2022/0281561 | A1* | 9/2022 | Gao | E21B 33/035 |

* cited by examiner

SYSTEMS FOR TRANSFERRING A FLUID TO AND/OR FROM A VESSEL AND PROCESSES FOR USING SAME

CROSS-REFERENCE TO RELATED APPLICATION

This application claims priority to U.S. Provisional Patent Application No. 63/391,151, filed on Jul. 21, 2022, which is incorporated by reference herein.

FIELD

Embodiments described generally relate to systems for transferring a fluid to and/or from a vessel and processes for using same. More particularly, such embodiments relate to fluid transfer systems placed or anchored at an offshore location that can be configured to moor a vessel thereto and to transfer a fluid to and/or from the vessel.

BACKGROUND

In the offshore renewable industry, it is becoming increasingly necessary or desirable to moor a vessel and transfer a fluid to and/or from the vessel. Certain systems, for example cryogenic transfer systems, are available including systems that transfer liquified natural gas (LNG). These systems, however, operate at a very low temperature and, as such, require special materials that can be very expensive.

There is a need, therefore, for improved systems for transferring a fluid to and/or from a vessel and processes for using same.

SUMMARY

Systems for transferring a fluid to and/or from a vessel and processes for using same are provided. In some embodiments, a fluid transfer system can include a mooring structure, a fluid swivel, a first subsea conduit, a second subsea conduit, a first surface conduit, a second surface conduit, and a crossover conduit. The mooring structure can be configured to be disposed in a body of water. The mooring structure can include a fixed part rotatively coupled to a rotating part. The fluid swivel can be configured to be disposed on the mooring structure. The fluid swivel can include a fixed part rotatively coupled to a rotating part. The fixed part and the rotating part of the fluid swivel can define a first fluid flow path and a second fluid flow path therethrough that can be segregated from one another. The fixed part of the fluid swivel can be coupled to the fixed part of the mooring structure. The first subsea conduit can be configured to provide fluid communication between a first pipeline disposed on a seabed and the first fluid flow path defined by the fluid swivel. The second subsea conduit can be configured to provide fluid communication between a second pipeline disposed on the seabed and the second fluid flow path defined by the fluid swivel. The first surface conduit can be configured to fluidly connect a fluid storage tank disposed on a vessel and the first fluid flow path defined by the fluid swivel. The first surface conduit can include a valve. The second surface conduit can be configured to fluidly connect the fluid storage tank and the second fluid flow path defined by the fluid swivel. The second surface conduit can include a valve. The crossover conduit can include a crossover valve. The crossover conduit can be configured to provide fluid communication between (i) the first surface conduit and the second surface conduit, (ii) the first subsea conduit and the second subsea conduit, or (iii) the first subsea conduit and an optional third pipeline disposed on the seabed. The fixed part of the fluid swivel and the rotating part of the fluid swivel can be configured to maintain fluid communication between the first subsea conduit and the first surface conduit via the first fluid flow path. The fixed part of the fluid swivel and the rotating part of the fluid swivel can be configured to maintain fluid communication between the second subsea conduit and the second surface conduit via the second fluid flow path. In some embodiments, the system can be configured to transfer a fluid having a boiling point that is less than an ambient temperature at atmospheric pressure to or from the fluid storage tank.

In other embodiments, a fluid transfer system can include a mooring structure, a fluid swivel, a subsea conduit, a surface conduit, and a crossover conduit. The mooring structure can be configured to be disposed in a body of water. The mooring structure can include a fixed part rotatively coupled to a rotating part. The fluid swivel can be configured to be disposed on the mooring structure. The fluid swivel can include a fixed part rotatively coupled to a rotating part. The fixed part and the rotating part of the fluid swivel can define a fluid flow path therethrough. The fixed part of the fluid swivel can be coupled to the fixed part of the mooring structure. The subsea conduit can be configured to provide fluid communication between a first pipeline disposed on a seabed and the fluid flow path defined by the fixed part and the rotating part of the fluid swivel. The surface conduit can be configured to fluidly connect a fluid storage tank disposed on a vessel and the fluid flow path defined by the fixed part and the rotating part of the fluid swivel. The surface conduit can include a valve. The crossover conduit can include a crossover valve. The crossover conduit can be configured to provide fluid communication between the subsea conduit and a second pipeline disposed on the seabed. The fixed part of the fluid swivel and the rotating part of the fluid swivel can be configured to maintain fluid communication between the subsea conduit and the surface conduit. In some embodiments, the system can be configured to transfer a fluid having a boiling point that is less than an ambient temperature at atmospheric pressure to or from the fluid storage tank.

In some embodiments, a process for transferring a fluid can include mooring a vessel to a mooring structure disposed in a body of water. The mooring structure can include a fluid swivel, a first subsea conduit, a second subsea conduit, a first surface conduit, a second surface conduit, and a crossover conduit. The fluid swivel can be disposed on the mooring structure. The fluid swivel can include a fixed part rotatively coupled to a rotating part. The fixed part and the rotating part of the fluid swivel can define a first fluid flow path and a second fluid flow path therethrough that can be re segregated from one another. The first subsea conduit can be in fluid communication with a first pipeline disposed on a seabed and the first fluid low path defined by the fluid swivel. The second subsea conduit can be in fluid communication with a second pipeline disposed on the seabed and the second fluid flow path defined by the fluid swivel. The first surface conduit can be in fluid communication with the first fluid flow path defined by the fluid swivel. The first surface conduit can be configured to fluidly connect to a fluid storage tank disposed on the vessel. The first surface conduit can include a valve. The second surface conduit can be in fluid communication with the second fluid flow path defined by the fluid swivel. The second surface conduit can be configured to fluidly connect to the fluid storage tank. The second surface conduit can include a valve. The crossover conduit can include a crossover valve. The crossover conduit can be in fluid communication with the first surface conduit and the second surface conduit. The fixed part of the fluid swivel can be coupled to the mooring structure. The fixed part of the fluid swivel and the rotating part of the fluid swivel can maintain fluid communication between the first subsea conduit and the first surface conduit via the first fluid flow path. The fixed part of the fluid swivel and the rotating part of the fluid swivel can maintain fluid communication between the second subsea conduit and the second surface conduit via the second fluid flow path. The process can also include connecting the first surface conduit to the fluid storage tank disposed on the vessel. The process can also include closing the valve of the first surface conduit. The process can also include opening the crossover valve. The process can also include flowing the fluid from the first subsea pipeline, through the first subsea conduit, the first fluid flow path defined by fluid swivel, at least a portion of the first surface conduit, the crossover conduit, at least a portion of the second surface conduit, the second fluid flow path defined by the fluid swivel, the second subsea conduit and into the second subsea pipeline. In some embodiments, the fluid can have a boiling point that is less than an ambient temperature at atmospheric pressure. The process can also include closing the crossover valve. The process can also include opening the valve of the first surface conduit. The process can also include flowing the fluid from the first subsea pipeline, through the first subsea conduit, through the first fluid flow path defined by the fluid swivel, through the first surface conduit and into the fluid storage tank disposed on the vessel. The process can also include closing the valve of the first surface conduit. The process can also include opening the crossover valve.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

DETAILED DESCRIPTION

Figure 1:
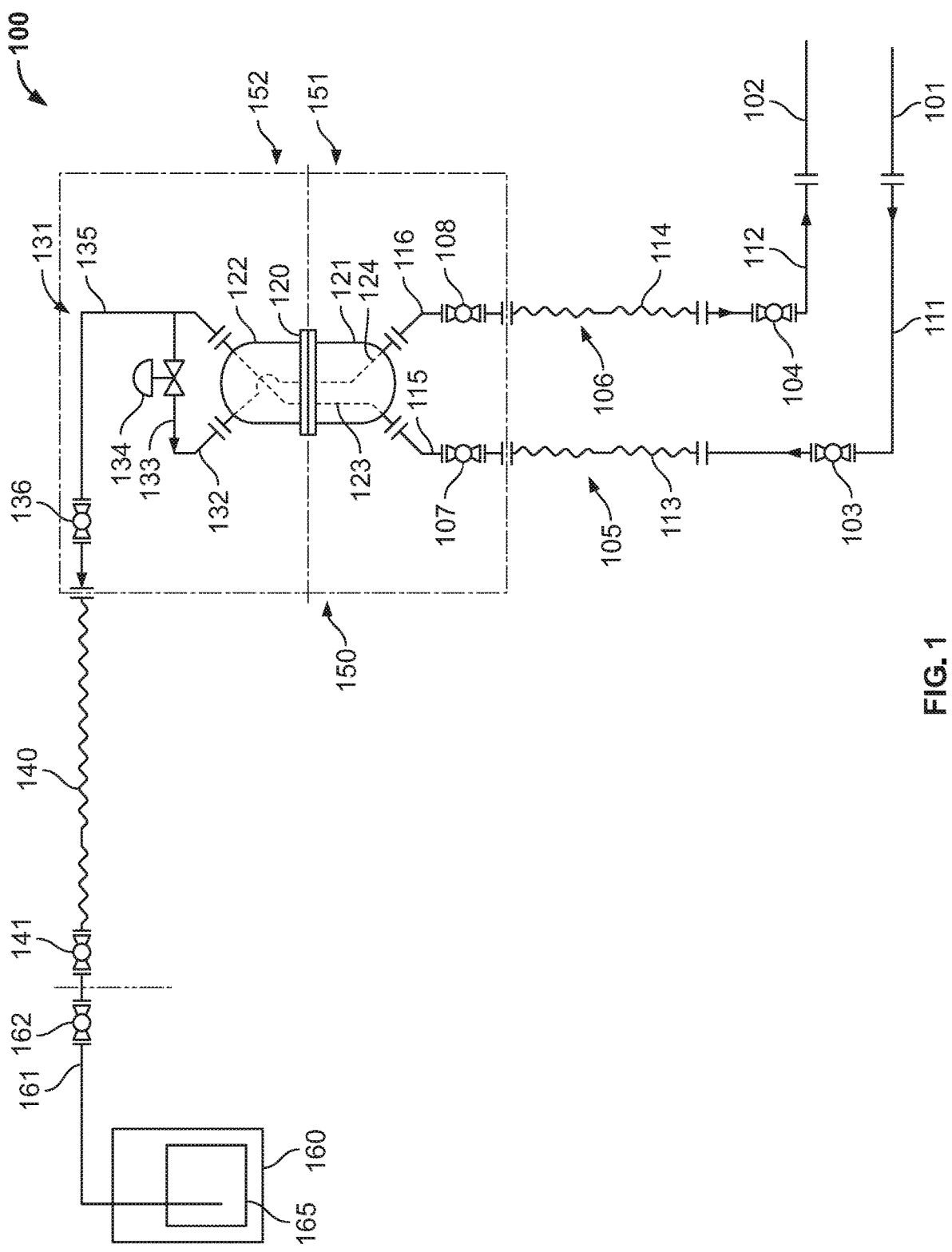
FIG. 1 depicts a flow diagram of an illustrative system for transferring a fluid to and/or from a fluid storage tank disposed on a vessel that includes a fluid swivel that defines at least two fluid flow paths therethrough and at least two surface conduits that can be placed in fluid communication with one another via a crossover conduit, according to one or more embodiments described.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure are exact or approximate values ("about") unless otherwise specifically stated. Accordingly, various embodiments of the disclosure may deviate from the numbers, values, and ranges disclosed herein without departing from the intended scope.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

FIG. 1 depicts a flow diagram of an illustrative system 100 for transferring a fluid to and/or from a fluid storage tank 165 disposed on a vessel 160, according to one or more embodiments. The system 100 can include a fluid swivel 120 that can define at least two fluid flow paths (two are shown 123, 124) therethrough and at least two surface conduits (two are shown, 131, 132). The surface conduits 131, 132 can be configured to be placed in fluid communication with one another via a crossover conduit 133. In some embodiments, the fluid can be a liquid that can have a boiling point that is less than an ambient temperature at atmospheric pressure, e.g., about 101.3 kPa-absolute. In some embodiments, the fluid can be ammonia, petroleum gas, or carbon dioxide. In some embodiments, the fluid can be maintained or substantially maintained in a liquid state at ambient temperature by maintaining the fluid at an elevated pressure.

In some embodiments, the fluid can be ammonia and the ammonia can be maintained or substantially maintained in a liquid state at a temperature of about 50° C. by maintaining the ammonia at a pressure of up to about 2,100 kPa-absolute. In some embodiments, the ammonia can be maintained or substantially maintained in a liquid state at a temperature of 40° C. by maintaining the ammonia at a pressure of up to about 1,650 kPa-absolute. In some embodiments, the ammonia can be refrigerated such that the fluid can be in a liquid state at ambient pressure. In some embodiments, the ammonia can be at a temperature of about −30° C., about −35° C., about −40° C., about −45° C., or about −50° C. to −55° C., −60° C., −65° C., or −70° C. In some embodiments, the fluid can be refrigerated ammonia in a liquid state. In some embodiments, the ammonia can be green ammonia and/or blue ammonia produced by reacting nitrogen separated from the air and green hydrogen and/or blue hydrogen, respectively, utilizing electricity produced via renewable source(s), e.g., electricity derived from wind, water, and/or solar.

In other embodiments, the fluid can be liquid petroleum gas. In some embodiments, the liquid petroleum gas can be or can include, but is not limited to, ethane, ethylene, propane, propylene, butane(s), butene(s), pentane(s), or any mixture thereof. In some embodiments, the liquid petroleum gas can also include one or more mercaptans as an odorant. In some embodiments, the liquid petroleum gas can be maintained or substantially maintained in a liquid state at a temperature of about 45° C. by maintaining the liquid petroleum gas at a pressure of about 1,090 kPa-absolute, about 1,410 kPa-absolute, or about 2,000 kPa-absolute to about 4,000 kPa-absolute, about 6,240 kPa-absolute, about 6,420 kPa-absolute, or about 8,120 kPa-absolute. In some embodiments, the liquid petroleum gas can be maintained in a liquid state at a temperature of about 32° C. by maintaining the liquid petroleum gas at a pressure of about 1,040 kPa-absolute, about 2,070 kPa-absolute, or about 3,000 kPa-absolute to about 4,550 kPa-absolute, about 6,070, kPa-absolute, or about 7,870 kPa-absolute. In some embodiments, the liquid petroleum gas can have a boiling point of about −45° C., about −35° C., or about −30° C. to about −20° C., about −10° C., or about 0° C. at atmospheric pressure, e.g., about 101.3 kPa-absolute. In some embodiments, the liquid petroleum gas can be refrigerated such that the liquid petroleum gas can be in a liquid state at ambient pressure. In some embodiments, the liquid petroleum gas can be refrigerated down to a temperature of about −35° C., about −40° C., about −45° C., or about −50° C. to −55° C., −60° C., −65° C., or −70° C. In some embodiments, the fluid can be a refrigerated liquified petroleum gas in a liquid state.

In some embodiments, the fluid can be carbon dioxide. In some embodiments, the carbon dioxide can be at a temperature of about −56.6 C, about −40 C, or about −30 C to about 0 C, about 15 C, or about 31.1 C at a pressure greater than 517 kPa-absolute, greater than 618 kPa-absolute, greater than 700 kPa-absolute, or greater than 800 kPa-absolute to about 1,000 kPa-absolute, about 1,500 kPa-absolute, about 3,000 kPa-absolute, or about 5,000 kPa-absolute. In some embodiments, the fluid can be a refrigerated carbon dioxide in a liquid state.

The system 100 can also include a mooring structure 150. The mooring structure 150 can be a fixed structure, for example a marine loading tower, or a floating or compliant structure, for example a catenary anchor leg mooring buoy (CALM buoy) or a single anchor leg mooring buoy (SALM buoy). In some embodiments, the catenary anchor leg mooring buoy can be a turntable buoy or a turret buoy. In some embodiments, the mooring structure 150 can include a fixed part 151 rotatively coupled to a rotating part 152. The fixed part 151 of the mooring structure 150 can be configured to be fixed/geostationary or relatively fixed/geostationary relative to the earth, meaning that the fixed part 151 of the mooring structure 150 can be configured to not substantially rotate about a vertical axis relative to the earth. In some embodiments, the fixed part 151 of the mooring structure 150 can rotate about a vertical axis relative to the earth by about +/−20 degrees or less, about +/−15 degrees or less, or +/−10 degrees or less. The mooring structure 150 can be configured to moor the vessel 160 to the rotating part 152 of the mooring structure 150.

The fluid swivel 120 can be disposed on the mooring structure 150. The fluid swivel 120 can include a fixed part 121 rotatively coupled to a rotating part 122. The fixed part 121 of the fluid swivel 120 can be coupled to the fixed part 151 of the mooring structure 150. In some embodiments, the rotating part 122 of the fluid swivel 120 can be coupled to the rotating part 152 of the mooring structure 150. The fluid swivel 120 can be configured to provide fluid communication between the fixed part 121 and the rotating part 122 of the fluid swivel 120 while the rotating part 122 of the fluid swivel 120 rotates relative to the fixed part 121 of the fluid swivel 120. As noted above, in some embodiments, the fluid swivel 120 can define one or more fluid flow paths therethrough, e.g., the first fluid flow path 123 and the second fluid flow path 124. In some embodiments, the fluid swivel 120 can define one or three or more fluid flow paths therethrough. The fluid swivel 120 can be configured to maintain the first fluid flow path 123 separate or otherwise segregated from the second fluid path 124 while the rotating part 122 of the fluid swivel 120 rotates relative to the fixed part 121 of the fluid swivel 120. The fluid swivel 120 can be configured to maintain the first fluid flow path 123 separate or otherwise segregated from the second fluid flow path 124 while simultaneously maintaining fluid communication through the first fluid flow path 123 and the second fluid flow path 124 of the fluid swivel 120 while the rotating part 122 of the fluid swivel 120 rotates relative to the fixed part 121 of the fluid swivel 120.

The system 100 can also include a first subsea conduit 105 that can be configured to provide fluid communication between a first pipeline 101 disposed on the seabed and the first fluid flow path 123 defined by the fluid swivel 120 and a second subsea conduit 106 that can be configured to provide fluid communication between a second subsea pipeline 102 disposed on the seabed and the second fluid flow path 124 defined by the fluid swivel 120. In some embodiments, the first subsea conduit 105 and the second subsea conduit 106 can each be configured as rigid conduits as flexible conduits, or as a combination of one or more rigid conduits and one or more flexible conduits.

In some embodiments, the first subsea conduit 105 can include a first rigid subsea conduit 111 in fluid communication with a first flexible subsea conduit 113 that can be in fluid communication with a swivel inlet conduit 115 that can be in fluid communication with the first fluid flow path 123 defined by the fluid swivel 120. In some embodiments, the second subsea conduit 106 can include a second rigid subsea conduit 112 in fluid communication with a second flexible subsea conduit 114 that can be in fluid communication with a swivel outlet conduit 116 that can be in fluid communication with the second fluid flow path 124 defined by the fluid swivel 120. The swivel inlet conduit 115 and the swivel outlet conduit 116 can be disposed on the fixed part 151 of the mooring structure 150 and/or the fixed part 121 of the fluid swivel 120. In some embodiments, the fluid swivel inlet conduit 115 and the fluid swivel outlet conduit 116 can be rigid conduits.

In some embodiments, the first subsea conduit 105 and/or the second subsea conduit 106 can each optionally include one or more valves. In some embodiments, the first rigid subsea conduit 111 and/or the second rigid subsea conduit 114 can include at least one valve 103, 104, respectively. In some embodiments, the swivel inlet conduit 115 and/or the swivel outlet conduit 116 can include at least one valve 107, 108, respectively.

The system 100 can also include, as noted above, a first surface conduit 131, a second surface conduit 132, and a crossover conduit 133. The first surface conduit 131 can be configured to provide fluid communication between the first fluid flow path 123 defined by the fluid swivel 120 and a loading pipe 161 disposed the vessel 160. The loading pipe 161 disposed on the vessel 160 can include a boarding valve 162 and can be in fluid communication with the storage tank 165 disposed on the vessel 160. The first surface conduit 131 can include at least one valve 136. In some embodiments, the valve 136 can be disposed on the rotating part 152 of the mooring structure 150 and/or the rotating part 122 of the fluid swivel 120. In some embodiments, the first surface conduit 131 can include a rigid conduit 135 disposed on the rotating part 152 of the mooring structure 150 and/or the rotating part 122 of the fluid swivel 120 that can be in fluid communication with a first flexible or first floating conduit 140. In some embodiments, the first flexible conduit 140 can be configured to float on or near the surface of the body of water. When a conduit is configured to float near the surface of the body of water, at least a portion of the top of the conduit between a first end and a second end thereof can be just below the surface of the body of water or located a depth of about 0.1 m, about 1 m, about 2 m, about 3 m, about 4 m, about 5 m, about 6 m, about 7 m, or more below the surface of the body of water. In some embodiments, the first flexible conduit 140 can include a valve 141. The second surface conduit 132 can be configured to be in fluid communication with the second fluid path 124 defined by the fluid swivel 120. In some embodiments, the second surface conduit 132 can be disposed on the rotating part 152 of the mooring structure 150 and/or the rotating part 122 of the fluid swivel 120. The crossover conduit 133 can be configured to fluidly connect the first surface conduit 131 and the second surface conduit 132. In some embodiments, the crossover conduit 133 can include a crossover valve 134 such that fluid communication between the first surface conduit 131 and the second surface conduit 132 via the crossover conduit 133 can be allowed or prevented via the crossover valve 134. In some embodiments, the crossover valve 134 can be a pressure relief valve, a pressure control valve, a remote operated valve, or a manually operated valve.

In some embodiments, the system 100 can be configured to flow the fluid, e.g., ammonia, LPG, or carbon dioxide, from the first pipeline 101 disposed on the seabed, through the first subsea conduit 105, through the first fluid flow path 123 defined by the fluid swivel 120, through the first surface conduit 131, through the loading pipe 161 disposed on the vessel 160, and into the storage tank 165 disposed on the vessel 160. In other embodiments, the system 100 can be configured to flow the fluid from the first pipeline 101 disposed on the seabed, through the first subsea conduit 105, through the first fluid flow path 123 defined by the fluid swivel 120, through a portion of the first surface conduit 131, through the crossover conduit 133, through the second surface conduit 132, through the second fluid flow path 124 defined by the fluid swivel 120, through the second subsea conduit 106, and into the second pipeline 102 disposed on the seabed.

In other embodiments, the system 100 can be configured to flow the fluid, e.g., ammonia, LPG, or carbon dioxide, from the first pipeline 101 disposed on the seabed, through the first subsea conduit 105, through the first fluid flow path 123 defined by the fluid swivel 120, through the first surface conduit 131, through the loading pipe 161 disposed on the vessel 160, and into the storage tank 165 disposed on the vessel 160 and, once the fluid storage tank 165 has been filled to a desired level, valve 136 can be closed and crossover valve 134 can be opened to allow the fluid to flow therethrough and into the second surface conduit 132 and ultimately into the second pipeline 102 disposed on the seabed. In still other embodiments, the system 100 can be configured to flow the fluid from the first pipeline 101 disposed on the seabed, through the first subsea conduit 105, through the first fluid flow path 123 defined by the fluid swivel 120, through a portion of the first surface conduit 131, through the crossover conduit 133, through the second surface conduit 132, through the second fluid flow path 124 defined by the fluid swivel 120, through the second subsea conduit 106, and into the second pipeline 102 disposed on the seabed, followed by closing the crossover valve 134 and opening valves 136, 141, 162, and then flowing the fluid through the first surface conduit 131, through the loading pipe 161 disposed on the vessel 160 and into the storage tank 165 disposed on the vessel 160.

In some embodiments, the system 100 can be configured to flow an inert gas from the first pipeline 101 disposed on the seabed, through the first subsea conduit 105, through the first fluid flow path 123 defined by the fluid swivel 120, through the first surface conduit 131, and into the loading pipe 161 disposed on the vessel 160 to remove a moisture or a water content from the system 100 prior to flowing the fluid. In some embodiments, the inert gas can be a non-combustible gas. In some embodiments, the inert gas can be or can include, but is not limited to, nitrogen, carbon dioxide, argon, or a mixture thereof. In some embodiments, the inert gas can be an exhaust gas or a dried exhaust gas, e.g., an exhaust gas or a dried exhaust gas produced by the vessel 160. In some embodiments, the system 100 can be configured to flow an inert gas, e.g., nitrogen, from the first pipeline 101 disposed on the seabed, through the first subsea conduit 105, through the first fluid flow path 123 defined by the fluid swivel 120, through the first surface conduit 131, and into the loading pipe 161 disposed on the vessel 160 to purge, or otherwise remove at least a portion of any residual fluid from at least a portion of the system 100 after transferring the fluid into the storage tank 165 disposed on the vessel 160.

In some embodiments, the system 100 can be configured to flow the inert gas from the first pipeline 101 disposed on the seabed, through the first subsea conduit 105, through the first fluid flow path 123 defined by the fluid swivel 120, through a portion of the first surface conduit 131, through the crossover conduit 133, through the second surface conduit 132, through the second fluid flow path 124 defined by the fluid swivel 120, through the second subsea conduit 106, and into the second pipeline 102 disposed on the seabed to remove or reduce a moisture or water content from at least a portion of the system 100 prior to flowing the fluid therethrough. In some embodiments, the system 100 can be configured to flow the inert gas from the first pipeline 101 disposed on the seabed, through the first subsea conduit 105, through the first fluid flow path 123 defined by the fluid swivel 120, through a portion of the first surface conduit 131, through the crossover conduit 133, through the second surface conduit 132, through the second fluid flow path 124 defined by the fluid swivel 120, through the second subsea conduit 106, and into the second pipeline 102 disposed on the seabed to purge, or otherwise remove at least a portion of the fluid from at least a portion of the system 100 after transferring the fluid into the storage tank 165 disposed on the vessel 160.

In other embodiments, the system 100 can be configured to flow the inert gas from the vessel 160, through the loading pipe 161, through the first surface conduit 131, through the crossover conduit 133, through the second surface conduit 132, through the fluid swivel 120, through the second subsea conduit 106, and into the second pipeline 102 disposed on the seabed to remove or reduce a moisture or water content from at least a portion of the system 100 prior to flowing the fluid therethrough. In still other embodiments, the system 100 can be configured to flow the inert gas from the vessel 160, through the loading pipe 161, through the first surface conduit 131, through the crossover conduit 133, through the second surface conduit 132, through the fluid swivel 120, through the second subsea conduit 106, and into the second pipeline 102 disposed on the seabed to remove or reduce a concentration of the fluid from the system 100 after transferring the fluid into the storage tank 165 disposed on the vessel 160.

In some embodiments, the system 100 can include a nitrogen cylinder or a nitrogen generator (not shown) disposed on the mooring structure 150 that can include a regulator or control valve in fluid communication with the first surface conduit 131, the second fluid conduit 132, the crossover conduit 133, or the fluid swivel 120 to purge the gaseous and/or liquid medium out of at least a portion of the system 100. In some embodiments, the system 100 can include a vent conduit (not shown) in fluid communication with the first surface conduit 131, the second surface conduit 132, and/or the crossover conduit 133. In some embodiments, the vent conduit can vent the gaseous and/or liquid medium to the atmosphere. In some embodiments, the fluid can be diluted in a vessel or tank (not shown) to a concentration that can be suitable or otherwise acceptable for release of the fluid to the atmosphere according to local regulations. In some embodiments, the vent conduit can include a valve. In other embodiments, the gaseous and/or liquid medium can be processed on the vessel 160 or onshore to remove impurities.

Figure 2:
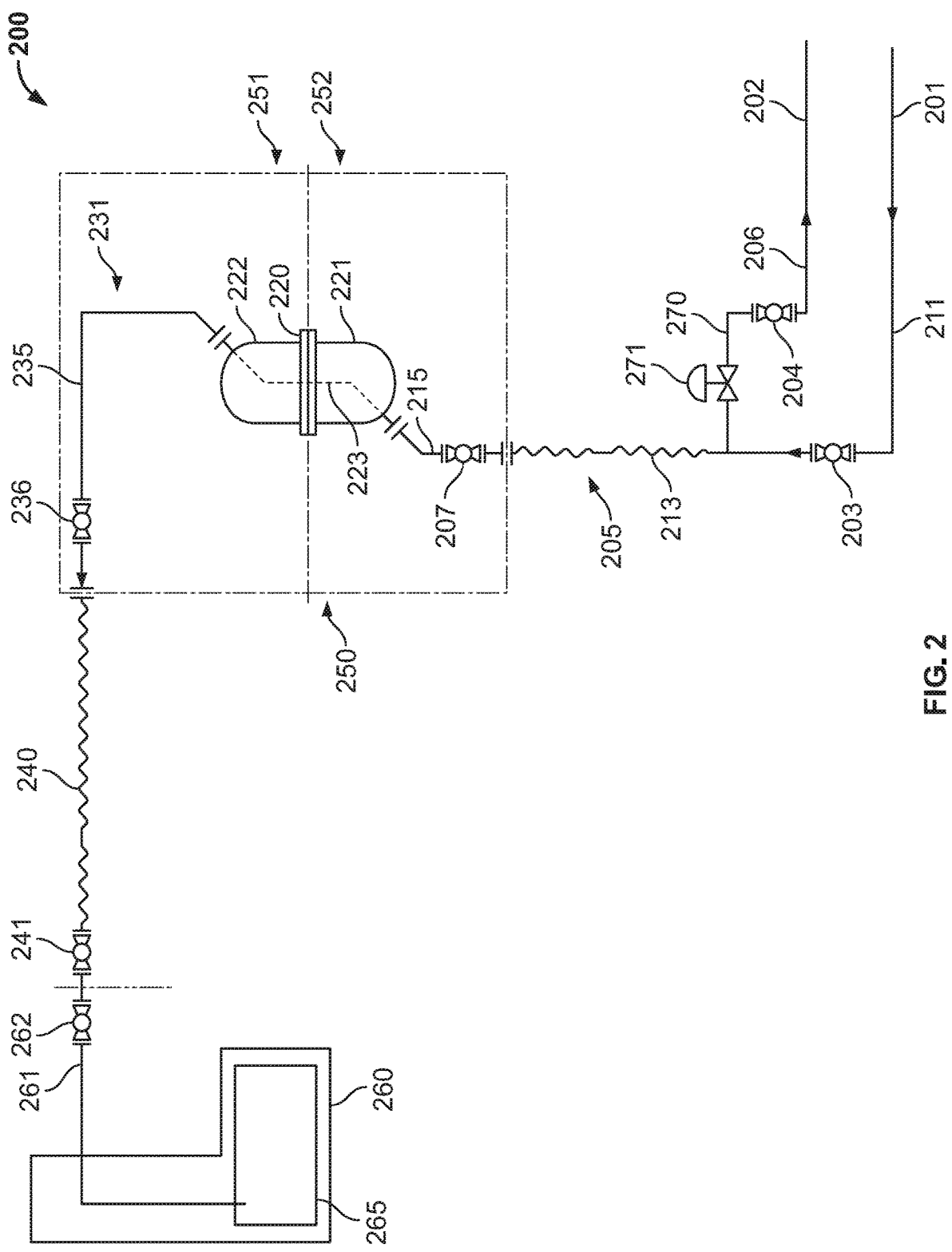
FIG. 2 depicts a flow diagram of another illustrative system for transferring a fluid to and/or from a fluid storage tank disposed on a vessel that includes a fluid swivel that defines a fluid flow path therethrough and a surface conduit, according to one or more embodiments described.

FIG. 2 depicts a flow diagram of another illustrative system 200 for transferring a fluid to and/or from a storage tank 265 disposed on a vessel 260 that includes a fluid swivel 220 that defines a fluid flow path 223 therethrough and a surface conduit 231, according to one or more embodiments. In some embodiments, the fluid can be a liquid that can have a boiling point that is less than an ambient temperature at an atmospheric pressure, e.g., about 101.3 kPa-absolute. In some embodiments, the fluid can be ammonia, liquid petroleum gas, or carbon dioxide as described above with reference to FIG. 1. The system 200 can also include a mooring structure 250. The mooring structure 250 can be a fixed structure, for example a marine loading tower, or a floating or compliant structure, for example a catenary anchor leg mooring buoy or a single anchor leg mooring buoy. In some embodiments, the mooring structure 250 can include a fixed part 251 rotatively coupled to a rotating part 251. In some embodiments, the mooring structure 250 can be the mooring structure 150 described above with reference to FIG. 1.

The fluid swivel 220 can be disposed on the mooring structure 250. The fluid swivel 220 can include a fixed part 221 rotatively coupled to a rotating part 222. The fluid swivel 220 can define the at least one fluid flow path 223 therethrough. The fixed part 221 of the fluid swivel 220 can be coupled to the fixed part 252 of the mooring structure 250. In some embodiments, the rotating part 222 of the fluid swivel 220 can be coupled to the rotating part 251 of the mooring structure 250. In some embodiments, the fluid swivel 220 can be an inline swivel. The fluid swivel 220 can maintain fluid communication between the fixed part 221 and the rotating part 222 of the fluid swivel 220 via the at least one flow path 223 while the rotating part 222 of the fluid swivel 220 rotates relative to the fixed part 221 of the fluid swivel 220.

The system 200 can include a first subsea conduit 205 configured to provide fluid communication between a first pipeline 201 disposed on the seabed and the first fluid flow path 223 defined by the fluid swivel 220, and a second subsea conduit 206 can be configured to provide fluid communication with a second pipeline 202 disposed on the seabed. In some embodiments, the first subsea conduit 205 and the second subsea conduit 206 can independently be configured as rigid conduits, as flexible conduits, or a combination of rigid and flexible conduits.

In some embodiments, the first subsea conduit 205 can include a first rigid subsea conduit 211 in fluid communication with a first flexible subsea conduit 213 that can be in fluid communication with a swivel inlet conduit 215 that can be in fluid communication with the first fluid flow path 223 defined by the fluid swivel 220. In some embodiments, the second subsea conduit 206 can be a second rigid subsea conduit. The swivel inlet conduit 215 can be disposed on the fixed part 252 of the mooring structure 250. In some embodiments, the fluid swivel inlet conduit 215 can be a rigid conduit.

In some embodiments, the first subsea conduit 205 and/or the second subsea conduit 206 can each include one or more valves. In some embodiments, the first rigid subsea conduit 211 and/or the second subsea conduit 206 can include at least one valve 203, 204, respectively. In some embodiments, the swivel inlet conduit 215 can include at least one valve 207. The system 200 can include a subsea crossover conduit 270 configured to provide fluid communication between the first subsea conduit 205 and the second subsea conduit 206. In some embodiments, the subsea crossover conduit 270 can be configured as a rigid conduit. In some embodiments, the subsea crossover conduit 270 can provide fluid communication between the first rigid subsea conduit 211 and the second subsea conduit 206. In some embodiments, the subsea crossover conduit 270 can include a subsea crossover valve 271 such that fluid communication between the first subsea conduit 205 and the second subsea conduit 206 via the crossover conduit 270 can be allowed or prevented via the crossover valve 271. In some embodiments, the crossover valve 271 can be configured as a pressure relief valve, a pressure control valve, a remote operated valve, or a manually operated valve.

The system 200 can also include a surface conduit 231. The surface conduit 231 can be configured to provide fluid communication between the fluid flow path 223 defined by the fluid swivel 220 and a loading pipe 261 disposed the vessel 260. The loading pipe 261 disposed on the vessel 260 can include a boarding valve 262 and can be in fluid communication with the storage tank 265 disposed on the vessel 260. The surface conduit 231 can include at least one valve 236. In some embodiments, the valve 236 can be disposed on the rotating part 252 of the mooring structure 250. In some embodiments, the surface conduit 231 can include a rigid conduit 235 disposed on the rotating part 252 of the mooring structure 250 and/or the rotating part 222 of the fluid swivel 220 that can be in fluid communication with a flexible or floating conduit 240. In some embodiments, the flexible conduit 240 can include a valve 241. In some embodiments, the flexible conduit 240 can be configured to float on or near the surface of the body of water.

In some embodiments, the system 200 can be configured to flow the fluid, e.g., ammonia, liquid petroleum gas, or carbon dioxide, from the first pipeline 201 disposed on the seabed, through the first subsea conduit 205, through the subsea crossover conduit 270, through the second subsea conduit 206, and into the second pipeline 202 disposed on the seabed. In some embodiments, the system 200 can be configured to flow the fluid, e.g., ammonia, liquid petroleum gas, or carbon dioxide, from the first pipeline 201 disposed on the seabed, through the first subsea conduit 205, through the fluid flow path 223 of the fluid swivel 220, through the surface conduit 231, through the loading pipe 261 disposed on the vessel 260 and into the storage tank 165 disposed on the vessel 160.

In some embodiments, the system 200 can be configured to flow an inert gas from the first pipeline 201 disposed on the seabed, through the first subsea conduit 205 through the fluid flow path 223 of the fluid swivel 220, through the surface conduit 231, and into the loading pipe 261 disposed on the vessel 260 to remove moisture or water from at least a portion of the system 200 prior to flowing the fluid through the system 200. In some embodiments, the system 200 can be configured to flow an inert gas, e.g., nitrogen, from the first pipeline 201 disposed on the seabed, through the first subsea conduit 205 through the fluid flow path 223 of the fluid swivel 220, through the surface conduit 231, and into the loading pipe 261 disposed on the vessel 260 after flowing the fluid through the system to purge or otherwise remove at least a portion of the fluid from the system 200. In some embodiments, the system 200 can include a nitrogen cylinder or a nitrogen generator (not shown) disposed on the mooring structure 250 that can include a regulator or control valve in fluid communication with the first surface conduit 231, or the swivel 220 to purge the fluid out of at least a portion of the system 200. In some embodiments, the system 200 can include a vent conduit (not shown) in fluid communication with the first surface conduit 231. In some embodiments, the vent conduit can vent the fluid to the atmosphere. In some embodiments, the fluid can be diluted in a vessel or tank (not shown) to a concentration that can be suitable or otherwise acceptable for release to the atmosphere according to local regulations. In some embodiments, the vent conduit can include a valve.

Figure 3:
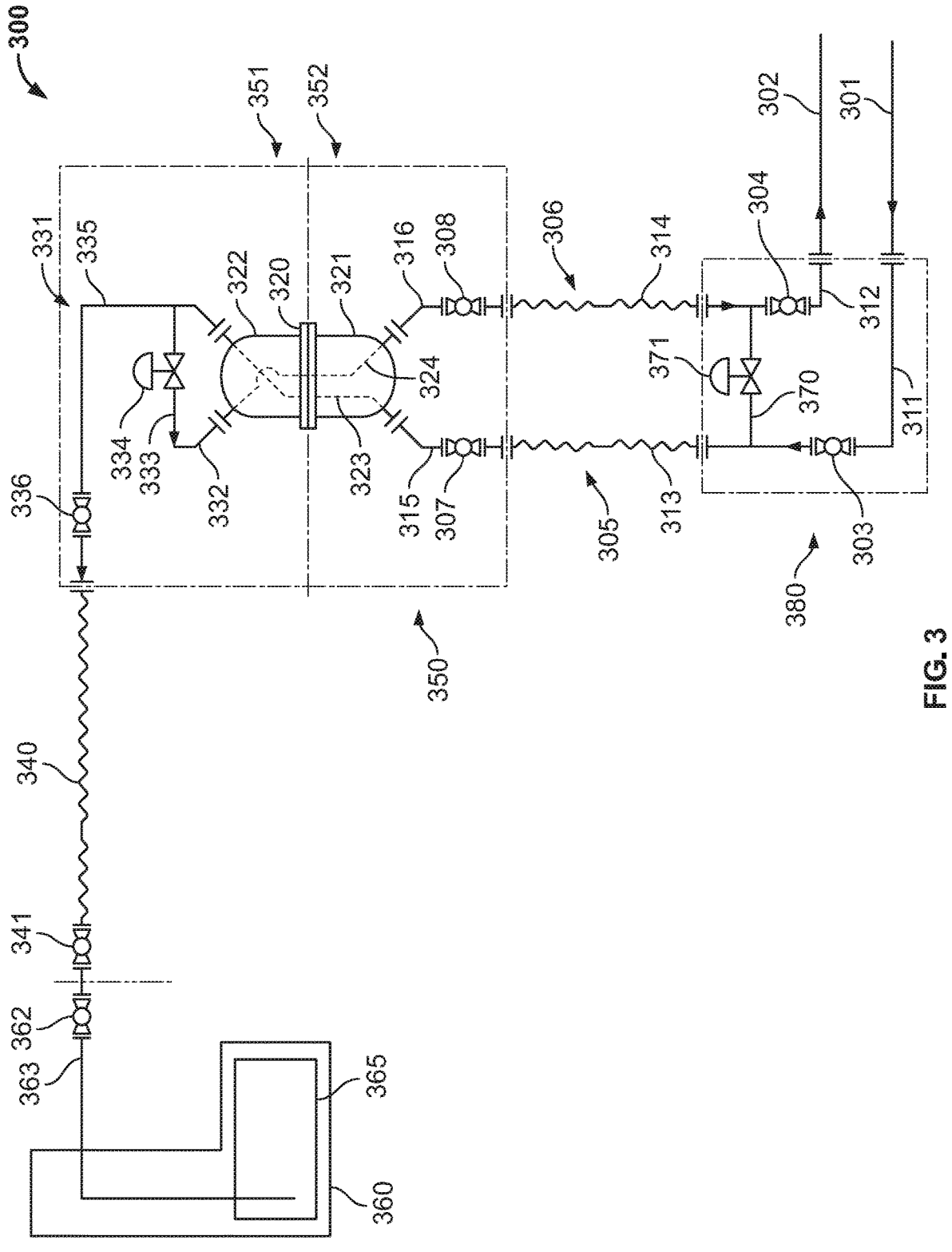
FIG. 3 depicts a flow diagram of another illustrative system for transferring a fluid to and/or from a fluid storage tank disposed on a vessel that includes a fluid swivel that defines at least two fluid flow paths therethrough, at least two surface conduits, and an optional subsea pipeline end manifold, according to one or more embodiments described.

FIG. 3 depicts a flow diagram of another illustrative system 300 for transferring a fluid to and/or from a storage tank 365 disposed on a vessel 360 that includes a fluid swivel 320 that defines at least two fluid flow paths therethrough (two are shown, 323, 324), at least two surface conduits (two are shown, 331, 332), and an optional subsea pipeline end manifold 380, according to one or more embodiments. In some embodiments, the fluid can be a liquid that can have a boiling point that is less than an ambient temperature at an atmospheric pressure, e.g., about 101.3 kPa-absolute. In some embodiments, the fluid can be ammonia, liquid petroleum gas, or carbon dioxide as described above with reference to FIG. 1. The system 300 can also include a mooring structure 350. The mooring structure 350 can be a fixed structure, for example a fixed mooring tower, or a floating or compliant structure, for example a catenary anchor leg mooring buoy or a single anchor leg mooring buoy. The mooring structure 350 can include a fixed part 352 rotatively coupled to a rotating part 351. In some embodiments, the mooring structure 350 can be the mooring structure 150 described above with reference to FIG. 1.

The fluid swivel 320 can be disposed on the mooring structure 350. The fluid swivel 320 can include a fixed part 321 rotatively coupled to a rotating part 322. The fixed part 321 of the fluid swivel 320 can be coupled to the fixed part 352 of the mooring structure 350. In some embodiments, the rotating part 322 of the fluid swivel 320 can be coupled to the rotating part 351 of the mooring structure 350. The fluid swivel 320 can be configured to provide fluid communication between the fixed part 321 and the rotating part 322 of the fluid swivel 320 while the rotating part 322 of the fluid swivel 320 rotates relative to the fixed part 321 of the fluid swivel 320.

In some embodiments, the fluid swivel 320 can define the first fluid flow path 323 and the second fluid flow path 324 therethrough. In other embodiments, the fluid swivel 320 can define three or more fluid flow paths therethrough. The fluid swivel 320 can be configured to provide the first fluid flow path 323 separate or otherwise segregated from the second fluid path 324 while the rotating part 322 of the fluid swivel 320 rotates relative to the fixed part 321 of the fluid swivel 320. The fluid swivel 320 can be configured to provide the first fluid flow path 323 separate or otherwise segregated from the second fluid flow path 324 while simultaneously maintaining fluid communication through the first fluid flow path 323 of the fluid swivel 320 and maintaining fluid communication through the second fluid flow path 324 of the fluid swivel 320 while the rotating part 322 of the fluid swivel 320 rotates relative to the fixed part 321 of the fluid swivel 320.

The system 300 can include a first subsea conduit 305 that can be configured to provide fluid communication between a first pipeline 301 disposed on the seabed and the first fluid flow path 323 defined by the fluid swivel 320 and a second subsea conduit 306 that can be configured to provide fluid communication between a second subsea pipeline 302 disposed on the seabed and the second fluid flow path 324 defined by the fluid swivel 320. In some embodiments, the first subsea conduit 305 and the second subsea conduit 306 can independently be configured as rigid conduits as flexible conduits, or a combination of rigid and flexible conduits.

In some embodiments, the first subsea conduit 305 can include a first rigid subsea conduit 311 in fluid communication with a first flexible subsea conduit 313 that can be in fluid communication with a swivel inlet conduit 315 that can be in fluid communication with the first fluid flow path 323 defined by the fluid swivel 320. In some embodiments, the second subsea conduit 306 can include a second rigid subsea conduit 312 in fluid communication with a second flexible subsea conduit 314 that can be in fluid communication with a swivel outlet conduit 316 that can be in fluid communication with the second fluid flow path 324 defined by the fluid swivel 320. The swivel inlet conduit 315 and the swivel outlet conduit 316 can be disposed on the fixed part 351 of the mooring structure 350. In some embodiments, the fluid swivel inlet conduit 315 and the fluid swivel outlet conduit 316 can be rigid conduits.

In some embodiments, the first subsea conduit 305 and/or the second subsea conduit 306 can each optionally include one or more valves. In some embodiments, the first rigid subsea conduit 311 and/or the second rigid subsea conduit 312 can include at least one valve 303, 304, respectively. In some embodiments, the swivel inlet conduit 315 and/or the swivel outlet conduit 316 can include at least one valve 307, 308, respectively. In some embodiments, the system 300 can include a subsea crossover conduit 370 configured to provide fluid communication between the first subsea conduit 305 and the second subsea conduit 306. In some embodiments, the subsea crossover conduit 370 can be configured as a rigid conduit disposed on the optional pipeline end manifold 380. In some embodiments, the subsea crossover conduit 370 can provide fluid communication between the first rigid subsea conduit 311 and the second rigid subsea conduit 312. In some embodiments, the subsea crossover conduit 370 can include a subsea crossover valve 371 such that fluid communication between the first subsea conduit 305 and the second surface conduit 306 via the crossover conduit can be allowed or prevented via the crossover valve 371. In some embodiments, the crossover valve 371 can be configured as a pressure relief valve, a pressure control valve, a remote operated valve, or a manually operated valve.

The system 300 can also include, as noted above, a first surface conduit 331 and a second surface conduit 332. The system 300 can also include a crossover conduit 333. The first surface conduit 331 can be configured to provide fluid communication between the first fluid flow path 323 defined by the fluid swivel 320 and a loading pipe 363 disposed the vessel 360. The loading pipe 363 disposed on the vessel 360 can include a boarding valve 362 and can be in fluid communication with the storage tank 365 disposed on the vessel 360. The first surface conduit 331 can include at least one valve 336. In some embodiments, the valve 336 can be disposed on the rotating part 352 of the mooring structure 350. In some embodiments, the first surface conduit 331 can include a rigid surface conduit 335 disposed on the rotating part 352 of the mooring structure 350 and/or the rotating part 322 of the fluid swivel 320 that can be in fluid communication with a flexible or surface conduit 340. In some embodiments, the flexible conduit 340 can include a valve 341. In some embodiments, the flexible conduit 340 can be a flexible hose or a flexible pipe. In some embodiments, the flexible conduit 340 can be configured to float on or near the surface of the body of water. The second surface conduit 332 can be configured to provide fluid communication with the second fluid path 324 defined by the fluid swivel 320. In some embodiments, the second surface conduit 332 can be disposed on the rotating part 352 of the mooring structure 350. The crossover conduit 333 can be configured to fluidly connect the first surface conduit 331 and the second surface conduit 332. In some embodiments, the crossover conduit 333 can include a crossover valve 334 such that fluid communication between the first surface conduit 331 and the second surface conduit 332 via the crossover conduit 333 can be allowed or prevented via the crossover valve 334. In some embodiments, the crossover valve 334 can be a pressure relief valve, a pressure control valve, a remote operated valve, or a manually operated valve.

In some embodiments, the system 300 can be configured to flow the fluid, e.g., ammonia, liquid petroleum gas, or carbon dioxide, from the first pipeline 301 disposed on the seabed, through the first subsea conduit 305 through the first fluid flow path 323 defined by the fluid swivel 320, through the first surface conduit 331, through the loading pipe 361 disposed on the vessel 360 and into the storage tank 365 disposed on the vessel 360. In other embodiments, the system 300 can be configured to flow the fluid from the first pipeline 301 disposed on the seabed, through the first subsea conduit 305, through the first fluid flow path 323 defined by the fluid swivel 320, through a portion of the first surface conduit 331, through the crossover conduit 333, through the second surface conduit 332, through the second fluid flow path 324 defined by the fluid swivel 320, through the second subsea conduit 306, and into the second pipeline 302 disposed on the seabed. In other embodiments, the system 300 can be configured to flow the fluid from the first pipeline 301 disposed on the seabed, through a portion of the first subsea conduit 305, through the subsea crossover conduit 370 through a portion of the second subsea conduit 306, and into the second pipeline 302 disposed on the seabed.

In some embodiments, the system 300 can be configured to flow an inert gas, e.g., nitrogen from the first pipeline 101 disposed on the seabed, through the first subsea conduit 305, through the first fluid flow path 323 defined by the fluid swivel 320, through the first surface conduit 331, and into the loading pipe 361 disposed on the vessel 360 to remove moisture or water from the system 300 prior to flowing the fluid. In some embodiments, the system 300 can be configured to flow an inert gas, e.g., nitrogen, from the first pipeline 101 disposed on the seabed, through the first subsea conduit 305, through the first fluid flow path 323 defined by the fluid swivel 320, through the first surface conduit 331, and into the loading pipe 361 disposed on the vessel 360 after flowing the fluid to purge or otherwise remove at least a portion of the fluid from at least a portion of the system 300. In some embodiments, the system 300 can be configured to flow an inert gas, e.g., nitrogen, from the first pipeline 301 disposed on the seabed, through the first subsea conduit 305, through the first fluid flow path 323 defined by the fluid swivel 320, through a portion of the first surface conduit 331, through the crossover conduit 333, through the second surface conduit 332, through the second fluid flow path 324 defined by the fluid swivel 320, through the second subsea conduit 306, and into the second pipeline 302 disposed on the seabed to remove moisture or water from at least a portion of the system 300 prior to flowing the fluid. In some embodiments, the system 300 can be configured to flow an inert gas, e.g., nitrogen, from the first pipeline 301 disposed on the seabed, through the first subsea conduit 305, through the first fluid flow path 323 defined by the fluid swivel 320, through a portion of the first surface conduit 331, through the crossover conduit 333, through the second surface conduit 332, through the second fluid flow path 324 defined by the fluid swivel 320, through the second subsea conduit 306, and into the second pipeline 302 disposed on the seabed to remove moisture or water from at least a portion of the system 300 after flowing the fluid to purge or otherwise remove at least a portion of the fluid from at least a portion of the system 300.

In some embodiments, the system 300 can include a nitrogen cylinder or a nitrogen generator 320 (not shown) disposed on the mooring structure 350 that can include a regulator or control valve in fluid communication with the first surface conduit 331, the second fluid conduit 332, the crossover conduit 333, or the swivel 320 to purge at least a portion of the liquid out of at least a portion of the system 300. In some embodiments, the system 300 can include a vent conduit (not shown) in fluid communication with the first surface conduit 331, the second surface conduit 332, and/or the crossover conduit 333. In some embodiments, the vent conduit can vent the fluid to the atmosphere. In some embodiments, the vent conduit can include a valve.

Figure 4:
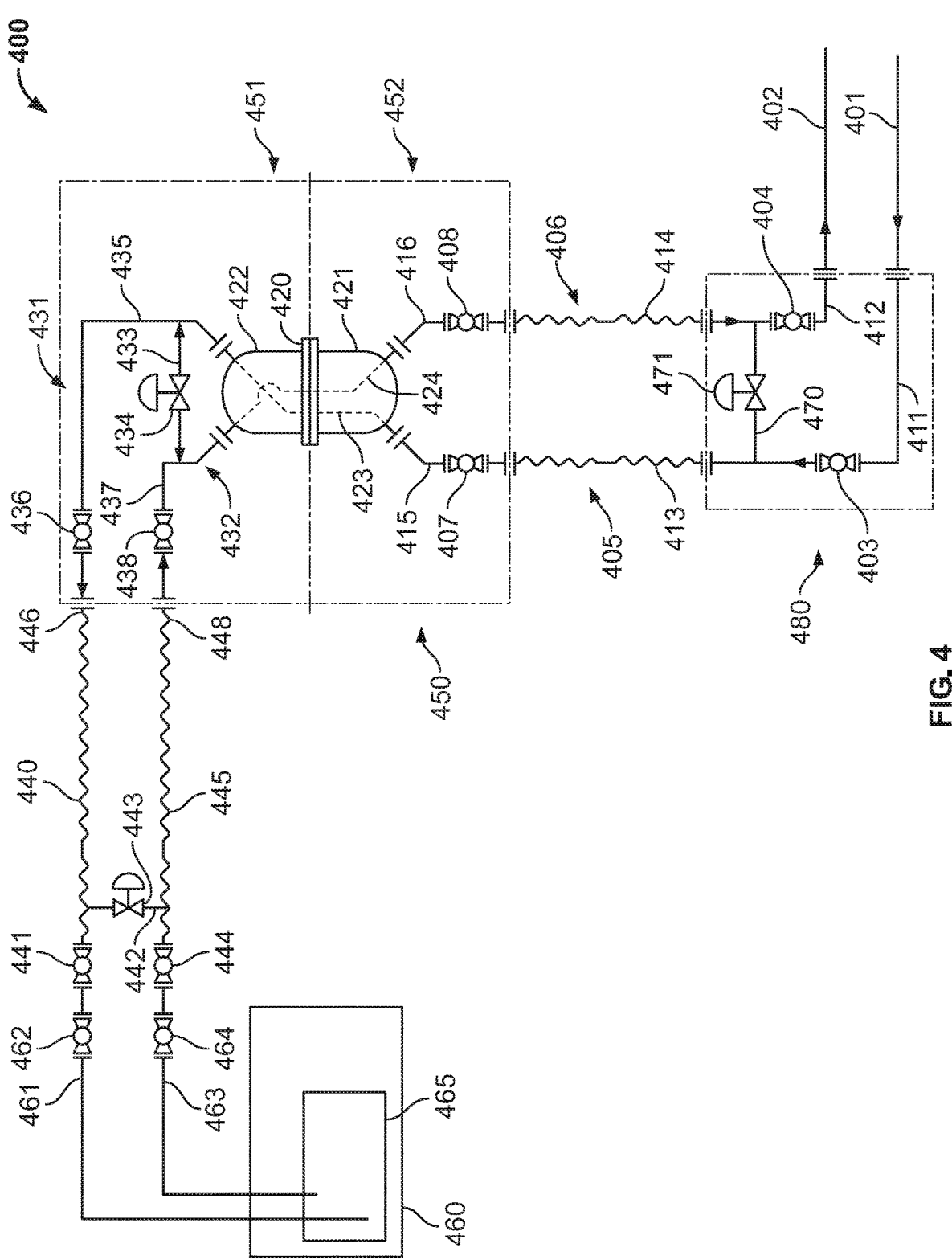
FIG. 4 depicts a flow diagram of another illustrative system for transferring a fluid to and/or from a fluid storage tank disposed on a vessel that includes a fluid swivel that defines at least two fluid flow paths therethrough, at least two surface conduits, and at least two subsea conduits, where the surface conduits and/or the subsea conduits can be placed in fluid communication with one another via one or more crossover conduits, according to one or more embodiments described.

FIG. 4 depicts a flow diagram of another illustrative system 400 for transferring a fluid to and/or from a storage tank 465 disposed on a vessel 460, according to one or more embodiments. The system 400 can include a fluid swivel 420 that defines at least two fluid flow paths (two are shown, 423, 424) therethrough, at least two surface conduits (two are shown, 431, 432), and at least two subsea conduits (two are shown, 405, 406). In some embodiments, the surface conduits 431, 432 can be placed in fluid communication with one another via a crossover conduit 433 and/or a crossover conduit 442. In some embodiments, the subsea conduits 405, 406 can be placed in fluid communication via a crossover conduit 470. In some embodiments, the fluid can be ammonia, liquid petroleum gas, or carbon dioxide as described above with reference to FIG. 1. The system 400 can include a mooring structure 450. The mooring structure 450 can be a fixed structure, for example a fixed mooring tower, or a floating or compliant structure, for example a catenary anchor leg mooring buoy or a single anchor leg mooring buoy. The mooring structure 450 can include a rotating part 451 rotatively coupled to a fixed part 452. In some embodiments, the mooring structure 450 can be the mooring structure 150 described above with reference to FIG. 1.

The fluid swivel 420 can be disposed on the mooring structure 450. The fluid swivel 420 can include a fixed part 421 rotatively coupled to a rotating part 422. The fixed part 421 of the fluid swivel 420 can be coupled to the fixed part 452 of the mooring structure 450. In some embodiments, the rotating part 422 of the fluid swivel 420 can be coupled to the rotating part 451 of the mooring structure 450. The fluid swivel 420 can be configured to maintain fluid communication between the fixed part 421 and the rotating part 422 of the fluid swivel 420 while the rotating part 422 of the fluid swivel 420 rotates relative to the fixed part 421 of the fluid swivel 420.

In some embodiments, the fluid swivel 420 can define, as noted above, the first fluid flow path 423 and a second fluid flow path 424 therethrough. In other embodiments, the fluid swivel 420 can define three or more fluid flow paths therethrough. The fluid swivel 420 can be configured to maintain the first fluid flow path 423 separate or otherwise segregated from the second fluid path 424 while the rotating part 422 of the fluid swivel 420 rotates relative to the fixed part 421 of the fluid swivel 420. The fluid swivel 420 can be configured to maintain the first fluid flow path 423 separate or otherwise segregated from the second fluid flow path 424 while simultaneously maintaining fluid communication through the first fluid flow path 423 of the fluid swivel 420 and maintaining fluid communication through the second fluid flow path 424 of the fluid swivel 420 while the rotating part 422 of the fluid swivel 420 rotates relative to the fixed part 421 of the fluid swivel 420.

The system 400 can also include, as noted above the first subsea conduit 405, which can be configured to provide fluid communication between a first pipeline 401 disposed on the seabed and the first fluid flow path 423 defined by the fluid swivel 420 and the second subsea conduit 406, which can be configured to provide fluid communication between a second subsea pipeline 402 disposed on the seabed and the second fluid flow path 424 defined by the fluid swivel 420. In some embodiments, the first subsea conduit 405 and the second subsea conduit 406 can each be configured as rigid conduits, as flexible conduits, or a combination of rigid and flexible conduits.

In some embodiments, the first subsea conduit 405 can include a first rigid subsea conduit 411 in fluid communication with a first flexible subsea conduit 413 that can be in fluid communication with a swivel inlet conduit 415 that can be in fluid communication with the first fluid flow path 423 defined by the fluid swivel 420. In some embodiments, the second subsea conduit 406 can include a second rigid subsea conduit 412 in fluid communication with a second flexible subsea conduit 414 that can be in fluid communication with a swivel outlet conduit 416 that can be in fluid communication with the second fluid flow path 424 defined by the fluid swivel 420. The swivel inlet conduit 415 and the swivel outlet conduit 416 can be disposed on the fixed part 451 of the mooring structure 450. In some embodiments, the fluid swivel inlet conduit 415 and the fluid swivel outlet conduit 416 can be rigid conduits.

In some embodiments, the first subsea conduit 405 and/or the second subsea conduit 406 can each optionally include one or more valves. In some embodiments, the first rigid subsea conduit 411 and/or the second rigid subsea conduit 414 can include at least one valve 403, 404, respectively. In some embodiments, the swivel inlet conduit 415 and/or the swivel outlet conduit 416 can include at least one valve 407, 408, respectively. In some embodiments, the system 400 can include, as noted above, the subsea crossover conduit 470 configured to provide fluid communication between the first subsea conduit 405 and the second subsea conduit 406. In some embodiments, the subsea crossover conduit 470 can be configured as a rigid conduit disposed on the optional pipeline end manifold 480. In some embodiments, the subsea crossover conduit 470 can provide fluid communication between the first rigid subsea conduit 411 and the second rigid subsea conduit 412. In some embodiments, the subsea crossover conduit 470 can include a subsea crossover valve 471 such that fluid communication between the first subsea conduit 405 and the second surface conduit 406 via the crossover conduit 470 can be allowed or prevented via opening and closing the crossover valve 471. In some embodiments, the crossover valve 471 can be configured as a pressure relief valve, a pressure control valve, a remote operated valve, or a manually operated valve.

The system 400 can also include, as noted above, the first surface conduit 431 and the second surface conduit 432. In some embodiments, the system 400 can optionally include at least one of the first crossover conduit 433 and the second crossover conduit 442. The first surface conduit 431 can be configured to provide fluid communication between the first fluid flow path 423 defined by the fluid swivel 420 and a loading pipe 461 disposed the vessel 460. The loading pipe 461 disposed on the vessel 460 can include a boarding valve 462 and can be in fluid communication with the storage tank 465 disposed on the vessel 460. The first surface conduit 431 can include at least one valve 436. In some embodiments, the valve 436 can be disposed on the rotating part 452 of the mooring structure 450. In some embodiments, the first surface conduit 431 can include a first rigid surface conduit 435 disposed on the rotating part 452 of the mooring structure 450 that can be in fluid communication with a first flexible or floating conduit 440. In some embodiments, the first flexible conduit 440 can include a valve 441. In some embodiments, the first flexible conduit 440 can be configured to float on or near the surface of the body of water. The second surface conduit 432 can be configured to provide fluid communication between the second fluid flow path 424 defined by the fluid swivel 420 and a discharge pipe 463 disposed the vessel 460. The discharge pipe 463 disposed on the vessel 460 can include a valve 462 and can be in fluid communication with the storage tank 465 disposed on the vessel 460. The second surface conduit 432 can include at least one valve 438. In some embodiments, the valve 438 can be disposed on the rotating part 452 of the mooring structure 450. In some embodiments, the second surface conduit 432 can include a second rigid surface conduit 437 disposed on the rotating part 452 of the mooring structure 450 that can be in fluid communication with a second flexible or floating conduit 445. In some embodiments, the second flexible conduit 445 can include a valve 444. In some embodiments, the second flexible conduit 445 can be configured to float on or near the surface of the body of water. The first crossover conduit 433 can be configured to fluidly connect the first surface conduit 431 and the second surface conduit 432. In some embodiments, the first crossover conduit 433 can be configured to fluidly connect the first rigid surface conduit 435 and the second rigid surface conduit 437. In some embodiments, the first crossover conduit 433 can include a first crossover valve 434 such that fluid communication between the first surface conduit 431 and the second surface conduit 432 via the crossover conduit 433 can be allowed or prevented via opening and closing the crossover valve 434. In some embodiments, the crossover valve 434 can be a pressure relief valve, a pressure control valve, a remotely operated valve, or a manually operated valve.

In some embodiments, the second crossover conduit 442 can be configured to fluidly connect the first surface conduit 431 and the second surface conduit 432. In some embodiments, the second crossover conduit 433 can be configured to fluidly connect the first flexible surface conduit 435 and the second rigid surface conduit 437. In other embodiments, the second crossover conduit 433 can be configured to fluidly connect the loading pipe 461 and the discharge pipe 463. In some embodiments, the second crossover conduit 442 can include a second crossover valve 443 such that fluid communication between the first surface conduit 431 and the second surface conduit 432 via the second crossover conduit 442 can be allowed or prevented via the crossover valve 443. In some embodiments, the crossover valve 443 can be a pressure relief valve, a pressure control valve, a remote operated valve, or a manually operated valve.

In some embodiments, the system 400 can be configured to flow the fluid, e.g., ammonia, liquid petroleum gas, or carbon dioxide, from the first pipeline 401 disposed on the seabed, through the first subsea conduit 405, through the first fluid flow path 423 defined by the fluid swivel 420, through the first surface conduit 431, through the loading pipe 461 disposed on the vessel 460 and into the storage tank 465 disposed on the vessel 460. In other embodiments, the system 400 can be configured to flow a fluid, e.g., ammonia, liquid petroleum gas, or carbon dioxide, in a gaseous state from the storage tank disposed on the vessel, through the discharge pipe 463 disposed on the vessel 460, through the second surface conduit 432 through the second fluid flow path 424 defined by the fluid swivel 420, through the second subsea conduit 406, and into the second subsea pipeline 402 disposed on the seabed.

In other embodiments, the system 400 can be configured to flow the fluid from the first pipeline 401 disposed on the seabed, through the first subsea conduit 405, through the first fluid flow path 423 defined by the fluid swivel 420, through a portion of the first surface conduit 431, through the first crossover conduit 433, though a portion of the second surface conduit 432, through the second fluid flow path 424 defined by the fluid swivel 420, through the second subsea conduit 406, and into the second pipeline 402 disposed on the seabed. In other embodiments, the system 400 can be configured to flow the fluid from the first pipeline 401 disposed on the seabed, through the first subsea conduit 405, through the first fluid flow path 423 defined by the fluid swivel 420, through at least a portion of the first surface conduit 431, through the second crossover conduit 442, through at least a portion of the second surface conduit 432, through the second fluid flow path 424 defined by the fluid swivel 420, through the second subsea conduit 406, and into the second pipeline 402 disposed on the seabed.

In other embodiments, when the second crossover conduit 442 is configured to provide fluid communication between the loading conduit 461 and the discharge conduit 463, the system 400 can be configured to flow the fluid from the first pipeline 401 disposed on the seabed, through the first subsea conduit 405, through the first fluid flow path 423 defined by the fluid swivel 420, through the first surface conduit 431, through the second crossover conduit 442, though the second surface conduit 432, through the second fluid flow path 424 defined by the fluid swivel 420, through the second subsea conduit 406, and into the second pipeline 402 disposed on the seabed. In other embodiments, the system 400 can be configured to flow the fluid from the first pipeline 401 disposed on the seabed, though a portion of the first subsea conduit 405, through the subsea crossover conduit 470 though a portion of the second subsea conduit 406, and into the second pipeline 402 disposed on the seabed.

In some embodiments, the system 400 can be configured to flow an inert gas, e.g., nitrogen from the first pipeline 401 disposed on the seabed, through the first subsea conduit 405, through the first fluid flow path 423 defined by the fluid swivel 420, through the first surface conduit 431, and into the loading pipe 461 disposed on the vessel 460 to remove a moisture or a water content therefrom prior to flowing the fluid therethrough. In other embodiments, the system 400 can be configured to flow an inert gas, e.g., nitrogen, from the first pipeline 401 disposed on the seabed, through the first subsea conduit 405, through the first fluid flow path 423 defined by the fluid swivel 420, through the first surface conduit 431, and into the loading pipe 461 disposed on the vessel 460 after flowing the fluid therethrough to remove at least a portion of any residual fluid therefrom.

In other embodiments, the system 400 can be configured to flow an inert gas, e.g., nitrogen, from the first pipeline 401 disposed on the seabed, through the first subsea conduit 405, through the first fluid flow path 423 defined by the fluid swivel 420, through at least a portion of the first surface conduit 431, through the first crossover conduit 433 and/or the second crossover conduit 442, through at least a portion of the second surface conduit 432, through the second fluid flow path 424 defined by the fluid swivel 420, through the second subsea conduit 406, and into the second pipeline 402 disposed on the seabed to remove at least a portion of any moisture or water therefrom prior to flowing the fluid into the fluid storage tank 465. In other embodiments, the system 400 can be configured to flow an inert gas, e.g., nitrogen, from the first pipeline 401 disposed on the seabed, through the first subsea conduit 405, through the first fluid flow path 423 defined by the fluid swivel 420, through at least a portion of the first surface conduit 431, through the first crossover conduit 433 and/or the second crossover conduit 442, through at least a portion of the second surface conduit 432, through the second fluid flow path 424 defined by the fluid swivel 420, through the second subsea conduit 406, and into the second pipeline 402 disposed on the seabed after flowing the fluid therethrough to remove at least a portion of any residual fluid therefrom.

In other embodiments, the system 400 can be configured to flow an inert gas, e.g., nitrogen, from the first pipeline 401 disposed on the seabed, through the first subsea conduit 405, through the first fluid flow path 423 defined by the fluid swivel 420, through at least a portion of the first surface conduit 431, through the second crossover conduit 442, through at least a portion of the second surface conduit 432, through the second fluid flow path 424 defined by the fluid swivel 420, through the second subsea conduit 406, and into the second pipeline 402 disposed on the seabed to remove at least a portion of any moisture or water therefrom prior to flowing the fluid therethrough. In other embodiments, the system 400 can be configured to flow an inert gas, e.g., nitrogen, from the first pipeline 401 disposed on the seabed, through the first subsea conduit 405, through the first fluid flow path 423 defined by the fluid swivel 420, through at least a portion of the first surface conduit 431, through the second crossover conduit 442, through at least a portion of the second surface conduit 432, through the second fluid flow path 424 defined by the fluid swivel 420, through the second subsea conduit 406, and into the second pipeline 402 disposed on the seabed after flowing the fluid therethrough to remove at least a portion of any residual fluid therefrom.

In some embodiments, the system 400 can include a nitrogen cylinder or a nitrogen generator 420 (not shown) disposed on the mooring structure 450 that can include a regulator or control valve in fluid communication with the first surface conduit 431, the second surface conduit 432, the first crossover conduit 433, the second crossover conduit 442, or the swivel 420 to purge at least a portion of any moisture and/or fluid therefrom. In some embodiments, the system 400 can include a vent conduit (not shown) in fluid communication with the first surface conduit 431, the second surface conduit 432, the first crossover conduit 433, and/or the second crossover conduit 442. In some embodiments, the vent conduit can vent the fluid to the atmosphere. In other embodiments, the fluid can be diluted in a vessel or tank (not shown) to a concentration that can be suitable or otherwise acceptable for release to the atmosphere according to local regulations. In some embodiments, the vent conduit can include a valve.

Figure 5:
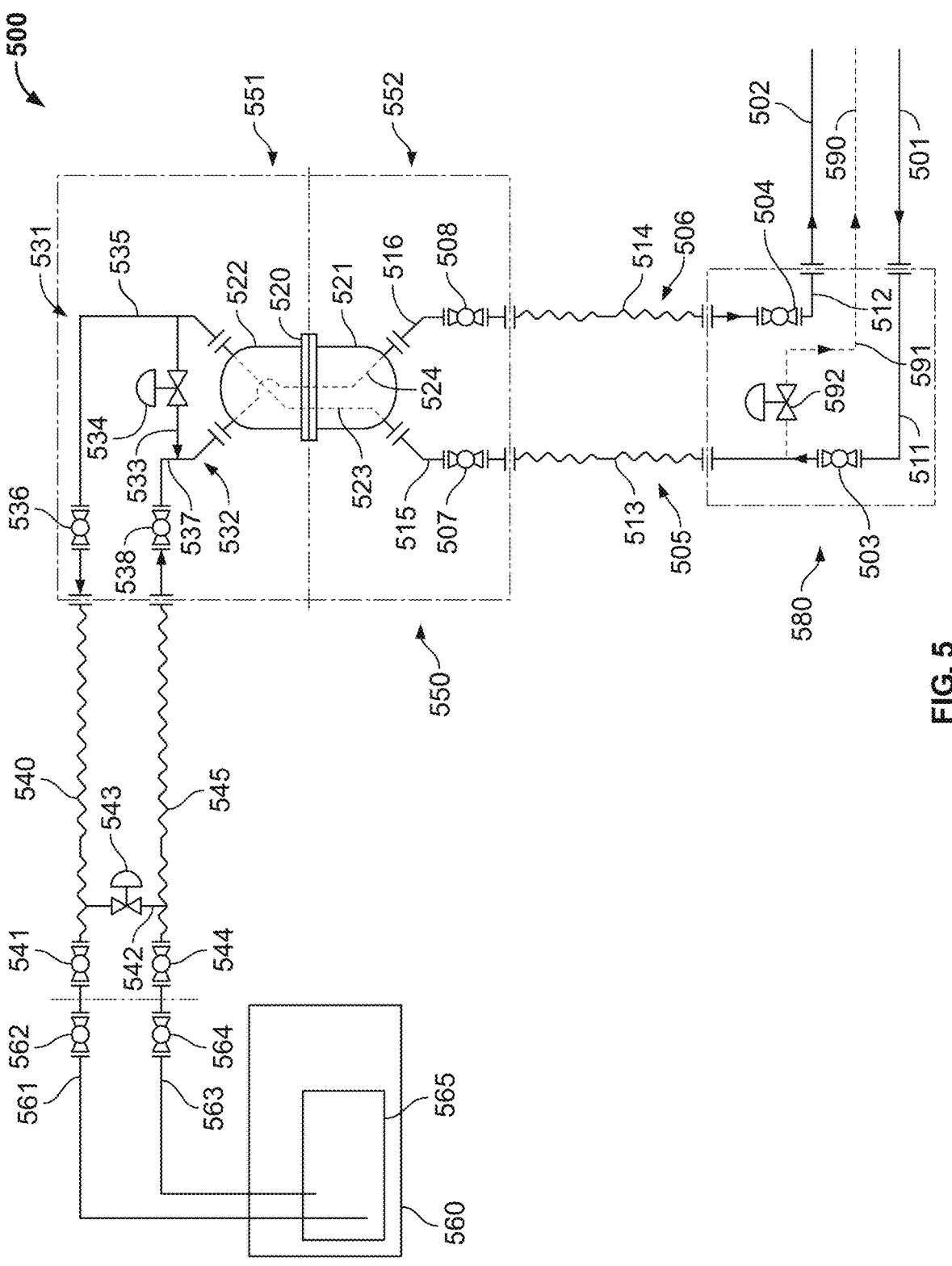
FIG. 5 depicts a flow diagram of another illustrative system for transferring a fluid to and/or from a storage tank disposed on a vessel that includes a fluid swivel that defines at least two flow paths therethrough, at least two surface conduits, and a dedicated recirculating subsea pipeline line, according to one or more embodiments described.

FIG. 5 depicts a flow diagram of another illustrative system 500 for transferring a fluid to and/or from a storage tank 565 disposed on a vessel 560 that includes a fluid swivel 520 that defines at least two flow paths (two are shown, 523, 524) therethrough, at least two surface conduits (two are shown, 531, 532), and a dedicated recirculating subsea pipeline line 590, according to one or more embodiments. The system 500 can also include a mooring structure 550. The mooring structure 550 can be a fixed structure, for example a fixed mooring tower, or a floating or compliant structure, for example a catenary anchor leg mooring buoy or a single anchor leg mooring buoy. In some embodiments, the mooring structure 550 can be the mooring structure 150 described above with reference to FIG. 1.

The fluid swivel 520 can be disposed on the mooring structure 550. The fluid swivel 520 can include a fixed part 521 rotatively coupled to a rotating part 522. The fixed part 521 of the fluid swivel 520 can be coupled to the fixed part 551 of the mooring structure 550. The rotating part 522 of the fluid swivel 520 can be coupled to the rotating part 552 of the mooring structure 550. The fluid swivel 520 can be configured to maintain fluid communication between the fixed part 521 and the rotating part 522 of the fluid swivel 520 while the rotating part 522 of the fluid swivel 520 rotates relative to the fixed part 521 of the fluid swivel 520.

In some embodiments, the fluid swivel 520 can define, as noted above, the first fluid flow path 523 and the second fluid flow path 524 therethrough. In other embodiments, the fluid swivel 520 can define three or more fluid flow paths therethrough. The fluid swivel 520 can be configured to maintain the first fluid flow path 523 separate or otherwise segregated from the second fluid path 524 while the rotating part 522 of the fluid swivel 520 rotates relative to the fixed part 521 of the fluid swivel 520. The fluid swivel 520 can be configured to maintain the first fluid flow path 523 separate or otherwise segregated from the second fluid flow path 524 while simultaneously maintaining fluid communication through the first fluid flow path 523 of the fluid swivel 520 and maintaining fluid communication through the second fluid flow path 524 of the fluid swivel 520 while the rotating part 522 of the fluid swivel 520 rotates relative to the fixed part 521 of the fluid swivel 520.

The system 500 can also include a first subsea conduit 505 that can be configured to provide fluid communication between a first pipeline 501 disposed on the seabed and the first fluid flow path 523 defined by the fluid swivel 520 and a second subsea conduit 506 that can be configured to provide fluid communication between a second subsea pipeline 502 disposed on the seabed and the second fluid flow path 524 defined by the fluid swivel 520. In some embodiments, the first subsea conduit 505 and the second subsea conduit 506 can independently be configured as rigid conduits, as flexible conduits, or as a combination of rigid and flexible conduits.

In some embodiments, the first subsea conduit 505 can include a first rigid subsea conduit 511 in fluid communication with a first flexible subsea conduit 513 that can be in fluid communication with a swivel inlet conduit 515 that can be in fluid communication with the first fluid flow path 523 defined by the fluid swivel 520. In some embodiments, the second subsea conduit 506 can include a second rigid subsea conduit 512 in fluid communication with a second flexible subsea conduit 514 that can be in fluid communication with a swivel outlet conduit 516 that can be in fluid communication with the second fluid flow path 524 defined by the fluid swivel 420. In some embodiments, the swivel inlet conduit 515 and the swivel outlet conduit 516 can be disposed on the fixed part 551 of the mooring structure 550. In some embodiments, the swivel inlet conduit 515 and the swivel outlet conduit 516 can be rigid conduits.

In some embodiments, the first subsea conduit 505 and/or the second subsea conduit 506 can each optionally include one or more valves. In some embodiments, the first rigid subsea conduit 511 and/or the second rigid subsea conduit 514 can include at least one valve 503, 504, respectively. In some embodiments, the swivel inlet conduit 515 and/or the swivel outlet conduit 516 can include at least one valve 507, 508, respectively. In some embodiments, the system 500 can include a third subsea conduit or crossover conduit 591 configured to provide fluid communication between the first subsea conduit 505 and the third pipeline or dedicated recirculating subsea pipeline 590 disposed on the seabed. In some embodiments, the third subsea conduit or crossover conduit 591 can be configured as a rigid conduit disposed on the optional pipeline end manifold 580. In some embodiments, the third subsea conduit or crossover conduit 591 can provide fluid communication between the first rigid subsea conduit 511 and the third pipeline 590 disposed on the seabed. In some embodiments, the third subsea conduit or crossover conduit 591 can include a subsea valve or crossover valve 592 such that fluid communication between the first subsea conduit 505 and the third pipeline 590 disposed on the seabed via the third subsea conduit or crossover conduit 591 can be allowed or prevented via the subsea valve or crossover valve 592. The valve 592 can be configured as a pressure relief valve, a pressure control valve, a remote operated valve, or a manually operated valve.

The system 500 can also include, as noted above, the first surface conduit 531 and the second surface conduit 532. In some embodiments, the system 500 can also include a surface or first surface crossover conduit 533 and/or a surface or second surface crossover conduit 542. The first surface conduit 531 can be configured to provide fluid communication between the first fluid flow path 523 defined by the fluid swivel 520 and a loading pipe 561 disposed the vessel 560. The loading pipe 561 disposed on the vessel 560 can include a boarding valve 562 and can be in fluid communication with the fluid storage tank 565 disposed on the vessel 560. In some embodiments, the first surface conduit 531 can include at least one valve 536. In some embodiments, the valve 536 can be disposed on the rotating part 552 of the mooring structure 550. In some embodiments, the first surface conduit 531 can include a first rigid surface conduit 535 disposed on the rotating part 552 of the mooring structure 550 that can be in fluid communication with a first flexible conduit 540. In some embodiments, the first flexible or floating conduit 540 can include at least one valve 541. In some embodiments, the first flexible conduit 540 can be configured to float on or near the surface of the body of water. The second surface conduit 532 can be configured to provide fluid communication between the second fluid flow path 524 defined by the fluid swivel 520 and a discharge pipe 563 disposed the vessel 560. The discharge pipe 563 disposed on the vessel 560 can include a valve 564 and can be in fluid communication with the storage tank 565 disposed on the vessel 560. The second surface conduit 532 can include at least one valve 538. In some embodiments, the valve 538 can be disposed on the rotating part 552 of the mooring structure 550. In some embodiments, the second surface conduit 532 can include a second rigid surface conduit 537 disposed on the rotating part 552 of the mooring structure 550 that can be in fluid communication with a second flexible or floating conduit 545. In some embodiments, the second flexible conduit 545 can include a valve 544. In some embodiments, the second flexible conduit 545 can be configured to float on or near the surface of the body of water. The crossover conduit 533 can be configured to fluidly connect the first surface conduit 531 and the second surface conduit 532. In some embodiments, the crossover conduit 533 can be configured to fluidly connect the first rigid surface conduit 535 and the second rigid surface conduit 537. In some embodiments, the crossover conduit 533 can include a crossover valve 534 such that fluid communication between the first surface conduit 531 and the second surface conduit 532 via the crossover conduit 533 can be allowed or prevented via the crossover valve 534. In some embodiments, the crossover valve 534 can be a pressure relief valve, a pressure control valve, a remote operated valve, or a manually operated valve. The second crossover conduit 542 can be configured to fluidly connect the first surface conduit 531 and the second surface conduit 532. In some embodiments, the second crossover conduit 542 can be configured to fluidly connect the first flexible surface conduit 535 and the second flexible surface conduit 545. In other embodiments, the second crossover conduit 542 can be configured to fluidly connect the loading conduit 561 and the discharge conduit 562. In some embodiments, the second crossover conduit 542 can include a crossover valve 543 such that fluid communication between the first surface conduit 531 and the second surface conduit 532 or the loading conduit 561 and the discharge conduit 563 via the crossover conduit 542 can be allowed or prevented via opening and closing of the crossover valve 543. In some embodiments, the crossover valve 543 can be a pressure relief valve, a pressure control valve, a remote operated valve, or a manually operated valve.

In some embodiments, the system 500 can be configured to flow the fluid, e.g., ammonia, liquid petroleum gas, or carbon dioxide, from the first pipeline 501 disposed on the seabed, through the first subsea conduit 505, through the first fluid flow path 523 defined by the fluid swivel 520, through the first surface conduit 531, through the loading pipe 561 disposed on the vessel 560, and into the storage tank 565 disposed on the vessel 560. In some embodiments, the system 500 can be configured to flow a fluid, e.g., ammonia, liquid petroleum gas, or carbon dioxide, in a gaseous state from the storage tank 565 disposed on the vessel 560, through the discharge pipe 563 disposed on the vessel 560, through the second surface conduit 532, through the second fluid flow path 524 defined by the fluid swivel 520, through the second subsea conduit 506, and into the second subsea pipeline 502 disposed on the seabed.

In other embodiments, the system 500 can be configured to flow the fluid from the first pipeline 501 disposed on the seabed, through the first subsea conduit 505, through the first fluid flow path 523 defined by the fluid swivel 520, through a portion of the first surface conduit 531, through the first crossover conduit 533, through a portion of the second surface conduit 532, through the second fluid flow path 524 defined by the fluid swivel 520, through the second subsea conduit 506, and into the second pipeline 502 disposed on the seabed. In other embodiments, the system 500 can be configured to flow the fluid from the first pipeline 501 disposed on the seabed, through the first subsea conduit 505, through the first fluid flow path 523 defined by the fluid swivel 520, through at least a portion of the first surface conduit 531, through the second crossover conduit 542, through at least a portion of the second surface conduit 532, through the second fluid flow path 524 defined by the fluid swivel 520, through the second subsea conduit 506, and into the second pipeline 502 disposed on the seabed. In other embodiments, the system 500 can be configured to flow the fluid from the first pipeline 501 disposed on the seabed, though a portion of the first subsea conduit 505, through the third subsea conduit 591 and into the third pipeline 590 disposed on the seabed.

In some embodiments, the system 500 can be configured to flow an inert gas, e.g., nitrogen, from the first pipeline 501 disposed on the seabed, through the first subsea conduit 505, through the first fluid flow path 523 defined by the fluid swivel 520, through the first surface conduit 531, and into the loading pipe 561 disposed on the vessel 560 to remove at least a portion of any moisture or a water content therefrom prior to flowing the fluid therethrough. In some embodiments, the system 500 can be configured to flow an inert gas, e.g., nitrogen, from the first pipeline 501 disposed on the seabed, through the first subsea conduit 505, through the first fluid flow path 523 defined by the fluid swivel 520, through the first surface conduit 531, and into the loading pipe 561 disposed on the vessel 560 after flowing the fluid therethrough to remove at least a portion of any residual fluid therefrom.

In some embodiments, the system can be configured to flow an inert gas, e.g., nitrogen, from the first pipeline 501 disposed on the seabed, through the first subsea conduit 505, through the first fluid flow path 523 defined by the fluid swivel 520, through at least a portion of the first surface conduit 531, through the first crossover conduit 533 and/or through the second crossover conduit 542, through at least a portion of the second surface conduit 532, through the second fluid flow path 524 defined by the fluid swivel 520, through the second subsea conduit 506, and into the second pipeline 502 disposed on the seabed to remove at least a portion of any moisture or water therefrom prior to flowing the fluid through at least a portion thereof. In some embodiments, the system 500 can be configured to flow an inert gas, e.g., nitrogen, from the first pipeline 501 disposed on the seabed, through the first subsea conduit 505, through the first fluid flow path 523 defined by the fluid swivel 520, through at least a portion of the first surface conduit 531, through the first crossover conduit 533 and/or through the second crossover conduit 542, through at least a portion of the second surface conduit 532, through the second fluid flow path 524 defined by the fluid swivel 520, through the second subsea conduit 506, and into the second pipeline 502 disposed on the seabed to after flowing the fluid therethrough to purge or otherwise remove at least a portion of the fluid therefrom.

In some embodiments, the system 500 can include a nitrogen cylinder or a nitrogen generator (not shown) disposed on the mooring structure 550 that can include a regulator or control valve in fluid communication with the first surface conduit 531, the second fluid conduit 532, the crossover conduit 533, or the fluid swivel 520 to purge moisture/water and/or residual fluid therefrom. In some embodiments, the system 500 can include a vent conduit (not shown) in fluid communication with the first surface conduit 531, the second surface conduit 532, the first crossover conduit 533, and/or the second crossover conduit 542. In some embodiments, the vent conduit can vent the fluid to the atmosphere. In other embodiments, the fluid can be diluted in a vessel or tank (not shown) to a concentration that can be suitable or otherwise acceptable for release to the atmosphere according to local regulations. In some embodiments, the vent conduit can include a valve.

In some embodiments, as will be well understood by a person having ordinary skill in the art, after a desired quantity of the fluid, e.g., liquid ammonia, has been transferred from the first pipelines 101, 201, 301, 401, and 501 through the systems 100, 200, 300, 400, and/or 500, respectively, and into the fluid storage tanks 165, 265, 365, 465, and 565, respectively, the crossover valves 134 (system 100), 271 (system 200), 334 and/or 371 (system 300), 434 and/or 443 and/or 471 (system 400), and 534 and/or 543 and/or 592 (system 500) can be opened to allow at least a portion of any boil-off vapor to flow into the second pipelines 102, 202, 304, 402, and 502 and/or the optional pipeline 590. In some embodiments, the boil-off vapor can be returned to a facility, e.g., an onshore facility, where the boil-off vapor can be recondensed into a liquid phase.

Figures 6, 7:
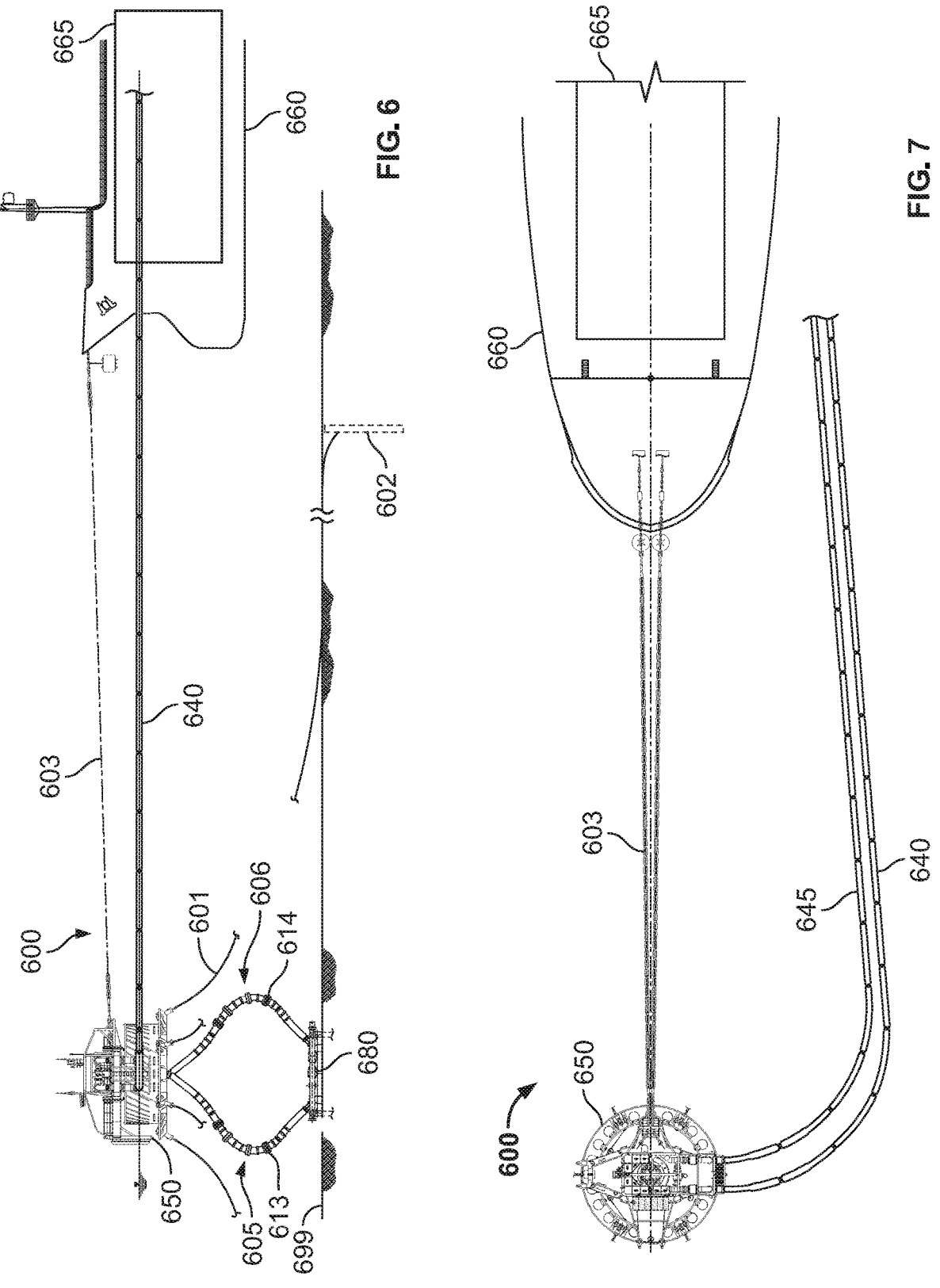
FIG. 6 depicts an elevation view of an illustrative fluid transfer system that includes a catenary anchor leg mooring buoy configured to transfer a fluid to and/or from a fluid storage tank disposed on a vessel moored to the buoy, according to one or more embodiments described.
FIG. 7 depicts a plan view of the illustrative fluid transfer system and vessel shown in FIG. 6.

FIG. 6 depicts an elevation view of an illustrative fluid transfer system 600 that includes a catenary anchor leg mooring buoy or simply a calm buoy or buoy 650 configured to transfer a fluid to and/or from a fluid storage tank 665 disposed on a vessel 660 moored to the buoy 650, according to one or more embodiments. FIG. 7 depicts a plan view of the illustrative fluid transfer system 600 and vessel 660 shown in FIG. 6. The system 600 can include a first subsea conduit 605, a second subsea conduit 606, a first floating conduit 640, a second floating conduit 645, the buoy 650, one or more mooring hawsers 603 (two are shown), one or more mooring legs 601 (several are shown) connected to an anchor point 602 disposed on a seabed 699, and an optional pipeline end manifold 680. In some embodiments, the catenary anchor leg mooring buoy 650 can be configured with the system 100, 200, 300, 400, or 500 described above with reference to FIGS. 1-5. In some embodiments, the systems 100, 200, 300, 400, and/or 500 can be configured to limit a pressure within the systems to less than 2,100 kPa-absolute while transferring liquid ammonia therethrough.

In some embodiments, the first floating conduit 640 and the second floating conduit 645 can each be configured as flexible hoses or flexible pipes. In some embodiments, the first floating conduit 640 and the second floating conduit 645 can be configured to float on or near the surface of the body of water. In some embodiments, the first subsea conduit 605 can include a first flexible subsea conduit 613 and the second subsea conduit 606 can include a second flexible subsea conduit 614. In some embodiments, the first flexible subsea conduit 613 and/or the second flexible subsea conduit 614 can be configured in a Chinese lantern shape, as shown. In such embodiments, the pipeline end manifold 680 can be generally located beneath or below the buoy 650.

In other embodiments, the first flexible subsea conduit 613 and/or the second flexible subsea conduit 614 can be configured in a Steep S configuration. In such embodiments, the system 600 configuration can include a submerged buoyant body (not shown) that can be tethered to the seabed. In such embodiments, the first flexible subsea conduit 613 and/or the second flexible subsea conduit 614 can be configured to be draped or otherwise laid over the buoyant body such that the first flexible subsea conduit 613 and/or the second flexible subsea conduit 614 can be urged into a steep, or sharp "S" shape. In such embodiments, the pipeline end manifold 680 can be generally at an offset position with respect to the buoy 650. In such embodiments, the first flexible subsea conduit 613 and/or the second flexible subsea conduit 614 can approach the seabed 699 at an approach or declination angle that is greater zero. In some embodiments, the approach, or declination angle can be about 40 degrees, about 50 degrees, about 60 degrees, or about 65 degrees to about 70 degrees, about 75 degrees, about 80 degrees, about 85 degrees, or about 90 degrees from horizontal.

In other embodiments, the first flexible subsea conduit 613 and/or the second flexible subsea conduit 614 can be configured in a Steep Wave configuration. In such embodiments, the system 600 can include a plurality of buoyant elements (not shown) distributed along at least a portion of the first flexible subsea conduit 613 and/or the second subsea flexible conduit 614 such that the first flexible subsea conduit 613 and/or the second subsea flexible conduit 614 are urged into a lazy or gradual "S" shape. In such embodiments, the pipeline end manifold 680 can be generally at an offset position from the buoy 650. In such embodiments, the first flexible subsea conduit 613 and/or the second flexible subsea conduit 614 can approach the seabed 699 at an approach or declination angle that is greater zero. In some embodiments, the approach, or declination angle can be about 40 degrees, about 50 degrees, about 60 degrees, or about 65 degrees to about 70 degrees, about 75 degrees, about 80 degrees, about 85 degrees, or about 90 degrees from horizontal.

In other embodiments, the first flexible subsea conduit 613 and/or second flexible subsea conduit 614 can be configured in a Lazy S configuration. In such embodiments, the system 600 configuration can include a submerged buoyant body that can be tethered to the seabed 699. In such embodiments, the first flexible subsea conduit 613 and/or the second flexible subsea conduit 614 can be configured to be draped or otherwise laid over the buoyant body such that the first flexible subsea conduit and/or the second flexible subsea conduit is urged into a lazy "S" shape. In such embodiments, the pipeline end manifold 680 can be generally at an offset position from the calm buoy 650. In such embodiments, the first flexible subsea conduit 613 and/or the second flexible subsea conduit 614 can approach the seabed and or approach the pipeline end manifold 680 at an approach or declination angle that is tangential or substantially horizontal.

In other embodiments, the first flexible subsea conduit 613 and/or the second flexible subsea conduit 614 can be configured in a Lazy Wave configuration. In such embodiments, the system 600 can include a plurality of buoyant elements distributed along at least a portion of the first flexible subsea conduit 613 and/or the second subsea flexible conduit 614 such that the first flexible subsea conduit 613 and/or the second subsea flexible conduit 614 are urged into a gradual "S" shape. In such embodiments, the pipeline end manifold 680 can be generally at an offset position from the calm buoy 650. In such embodiments, the first flexible subsea conduit 613 and/or the second flexible subsea conduit 614 can approach the seabed and or approach the pipeline end manifold at an approach or declination angle that is tangential or substantially horizontal. The Chinese Lantern, Steep S, Steep Wave, Lazy S, and Lazy Wave configurations are all well known to a person having ordinary skill in the art of subsea riser engineering.

Figure 8:
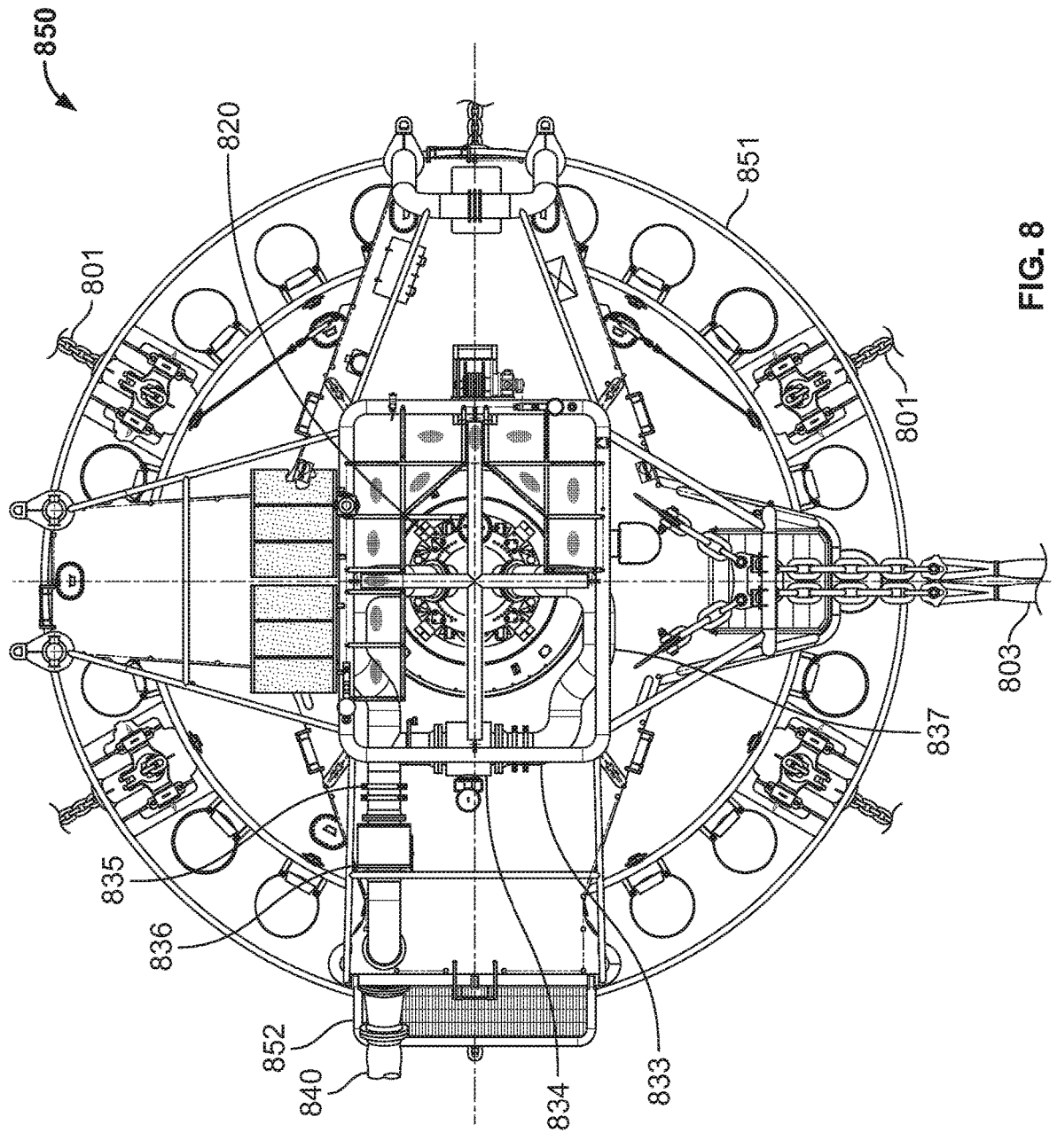
FIG. 8 depicts a detailed plan view of an illustrative catenary anchor leg mooring buoy configured to moor a vessel thereto and to transfer a fluid to and/or from a fluid storage tank disposed on the vessel, according to one or more embodiments described.
Figure 9:
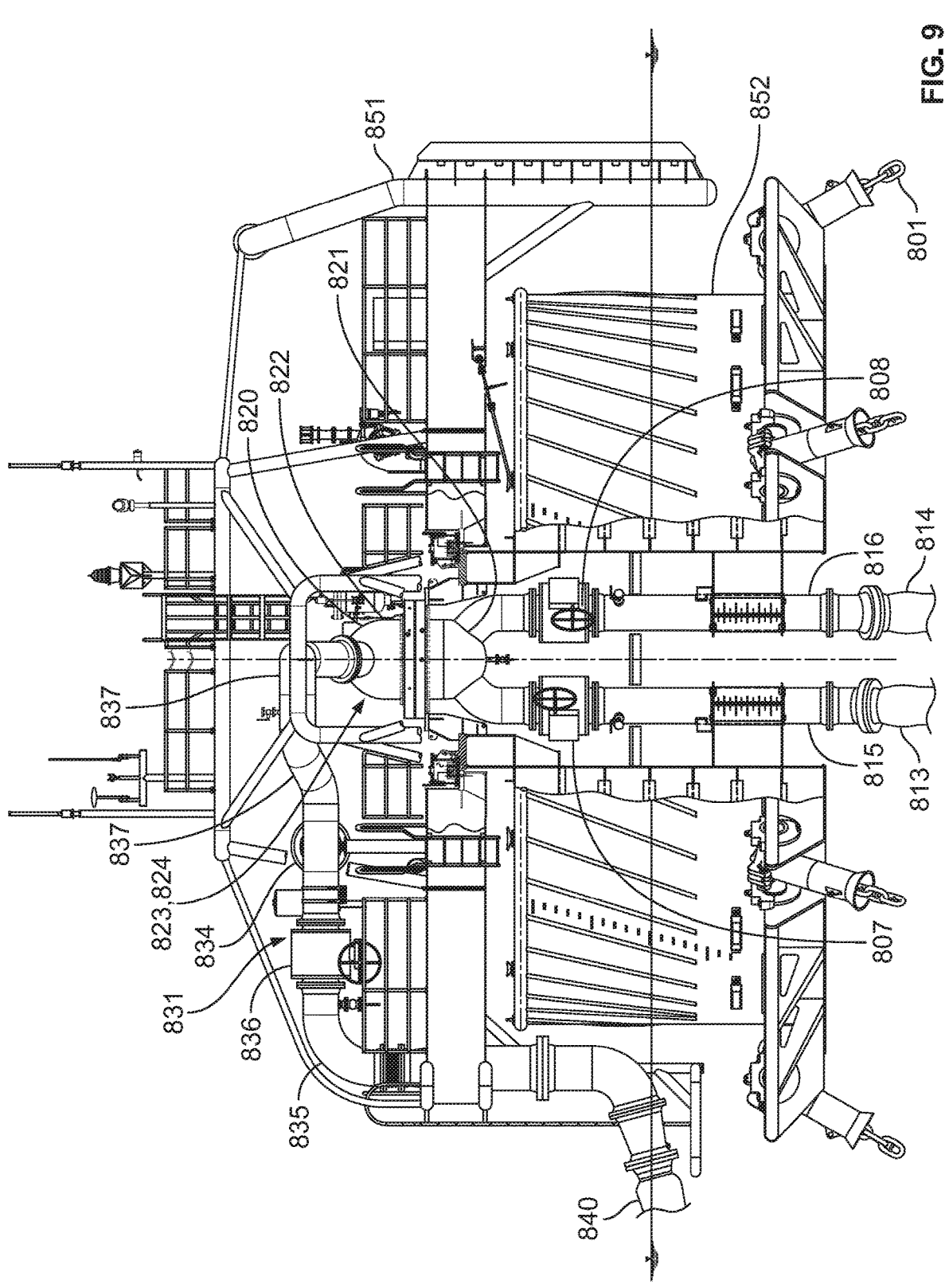
FIG. 9 depicts an elevation view of the catenary anchor leg mooring buoy shown in FIG. 8.

FIG. 8 depicts a detailed plan view of an illustrative catenary anchor leg mooring buoy or simply calm buoy 850 configured to moor a vessel thereto and to transfer a fluid to and/or from a fluid storage tank disposed on the vessel, according to one or more embodiments. FIG. 9 depicts an elevation view of the catenary anchor leg mooring buoy 850 shown in FIG. 8. In some embodiments, the fluid can be a liquid that can have a boiling point that is less than an ambient temperature at an atmospheric pressure, e.g., about 101.3 kPa-absolute. In some embodiments, the fluid can be ammonia, liquid petroleum gas, or carbon dioxide as described above with reference to FIG. 1. In some embodiments, the calm buoy 850 can be configured with the system 100, 200, 300, 400, or 500 described above with reference to FIGS. 1-5.

The calm buoy 850 can include a fixed part 852 rotatively coupled to a rotating part 851. The fixed part 852 of the calm buoy 850 can be configured to be fixed/geostationary or relatively fixed/geostationary relative to the earth, meaning that the fixed part 852 of the calm buoy 850 can be configured to not substantially rotate about a vertical axis relative to the earth. In some embodiments, the fixed part 852 of the calm buoy 850 can rotate relative about a vertical axis relative to the earth by about +/−20 degrees or less, about +/−15 degrees or less, or +/−10 degrees or less. The calm buoy 850 can be configured to moor a vessel (not shown), but similar to or the same as the vessel 660 depicted in FIGS. 6 and 7, to the rotating part 851 of the calm buoy 850. The calm buoy 850 can include a mooring hawser 803, two are shown, that can be configured to moor the vessel to the calm buoy 850. The calm buoy 850 can have mooring leg 801, six are shown. The mooring leg 801 can be configured to be secured to the seabed at a first end thereof and connected to the fixed part 852 of the calm buoy 850 at a second end thereof.

The calm buoy 850 can include a fluid swivel 820. In some embodiments, the fluid swivel can define a first fluid flow path 823 and a second fluid flow 824 path therethrough. In other embodiments, the fluid swivel 820 can define three or more fluid flow paths therethrough. The fluid swivel 820 can include a fixed part 821 rotatively coupled to a rotating part 822. The fixed part 821 of the fluid swivel 820 can be coupled to the fixed part 851 of the calm buoy 850. In some embodiments, the rotating part 822 of the fluid swivel 820 can be coupled to the rotating part 852 of the calm buoy 850. The fluid swivel 820 can be configured to maintain the first fluid flow path 823 separate or otherwise segregated from the second fluid flow path 824 while the rotating part 822 of the fluid swivel 820 rotates relative to the fixed part 821 of the fluid swivel 820. The fluid swivel 120 can be configured to maintain the first fluid flow path 823 separate or otherwise segregated from the second fluid flow path 824 while simultaneously maintaining fluid communication through the first fluid flow path 823 of the fluid swivel 820 and maintaining fluid communication through the second fluid flow path 824 of the fluid swivel 820 while the rotating part 822 of the fluid swivel 820 rotates relative to the fixed part 821 of the fluid swivel 820.

The calm buoy 850 can also include a first surface conduit 831, a crossover conduit 833, and a second surface conduit 837. The first surface conduit 831 can be configured to provide fluid communication between the first fluid flow path 823 defined by the fluid swivel 820 and a loading pipe disposed on the vessel (not shown), but similar to or the same as the loading pipe 161 described above with reference to FIG. 1. The first surface conduit 831 can include at least one valve 836. In some embodiments, the valve 836 can be disposed on the rotating part 852 of the calm buoy 850. In some embodiments, the valve 836 can be a butterfly valve, a ball valve, or a gate valve. In some embodiments, the first surface conduit 831 can include a first rigid conduit 835 disposed on the rotating part 852 of the calm buoy 850 that can be in fluid communication with a first floating conduit 840. In some embodiments, the first floating conduit 840 can include a valve (not shown). In some embodiments, the valve of the first floating conduit 840, if present can be a butterfly valve, a ball valve, or a gate valve. In some embodiments, the first floating conduit 840 can be configured to float on or near the surface of the body of water.

The second surface conduit 837 can be configured to provide fluid communication with the second fluid path 823, defined by the fluid swivel 820. In some embodiments, the second surface conduit 837 can be a rigid conduit. In some embodiments, the second surface conduit 837 can be disposed on the rotating part 852 of the calm buoy 850. In some embodiments, not shown, the second surface conduit 837 can include a second rigid conduit disposed on the rotating part 852 of the calm buoy 850 that can be in fluid communication with a second floating conduit. In such embodiments, the second floating conduit can include a valve. In such embodiments, the second floating conduit can be configured to float on or near the surface of the body of water.

The crossover conduit 833 can be configured to fluidly connect the first surface conduit 831 and the second surface conduit 837. In some embodiments, the crossover conduit 833 can be configured to fluidly connect the first rigid conduit 835 with the second surface conduit 837. In some embodiments, the crossover conduit 833 can include a crossover valve 834 such that fluid communication between the first rigid conduit 835 and the second surface conduit 837 via the crossover conduit 8133 can be allowed or prevented via the crossover valve 834. The crossover valve 834 can be a pressure relief valve, a pressure control valve, a remote operated valve, or a manually operated valve.

In some embodiments, the calm buoy 850 can include a swivel inlet conduit 815 disposed on the fixed part 552 of the calm buoy 850. The swivel inlet conduit 815 can be configured to fluidly connect the first fluid flow path 823 of the fluid swivel 820 to a first flexible subsea conduit 813. In some embodiments, the calm buoy 850 can include a swivel outlet conduit 816 disposed on the fixed part 552 of the calm buoy 850. The swivel outlet conduit 816 can be configured to fluidly connect the second fluid flow path 824 of the fluid swivel 820 to a second flexible subsea conduit 814. In some embodiments, the inlet conduit 815 and the outlet conduit

816 can each be configured with a valve 807, 808. In some embodiments, the valves 807, 808 can be a butterfly valve, a ball valve, or a gate valve.

Figure 10:
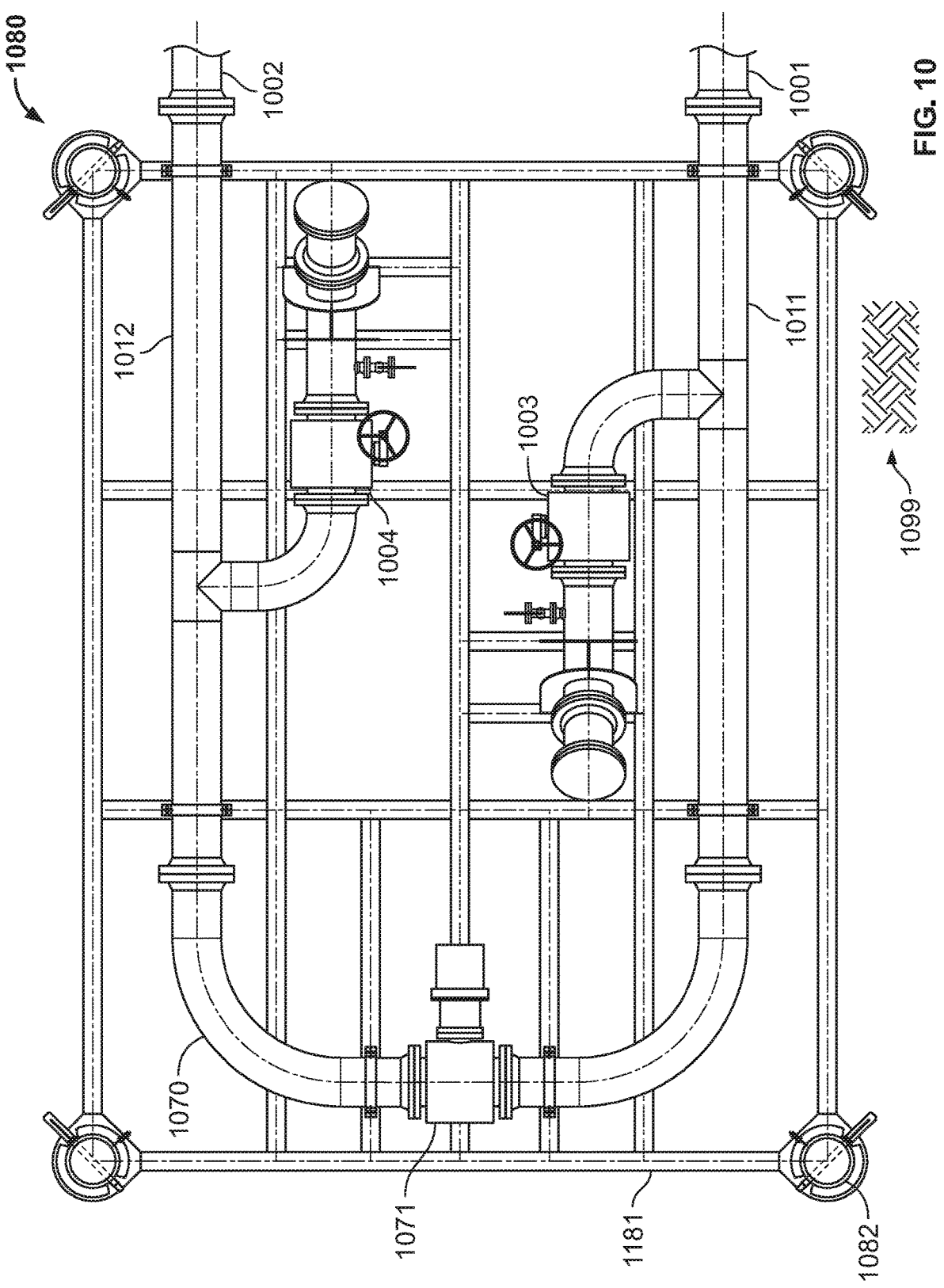
FIG. 10 depicts a plan view of an illustrative pipeline end manifold that includes a crossover conduit that can be configured to fluidly connect a first subsea pipeline and a second subsea pipeline disposed on a seabed, according to one or more embodiments described.

FIG. 10 depicts a plan view of an illustrative pipeline end manifold 1080 that includes a crossover conduit 1071 that can be configured to fluidly connect a first subsea pipeline 1001 and a second subsea pipeline 1002 disposed on a seabed 1099, according to one or more embodiments. In some embodiments, the pipeline end manifold 1080 can include a structural frame 1181 and can be secured to the seabed 1099 with at least one pile 1082, four are shown. In other embodiments, the pipeline end manifold 1080 can be secured to the seabed with gravity blocks (not shown).

In some embodiments, the pipeline end manifold 1080 can include a first rigid subsea conduit 1011, a second rigid subsea conduit 1012, and the crossover conduit 1070. In some embodiments, the first rigid subsea conduit 1011 and the second rigid subsea conduit 1012, can each be configured with a valve 1003, 1004, respectively. Each valve, 1003, 1004 can be a diver operated valve, a valve controlled via a remotely operated vehicle, or a remotely controlled valve. In some embodiments, the valves 1003, 1004 can independently be a butterfly valve, a ball valve, or a gate valve. In some embodiments, the crossover valve 1071 can be a pressure relief valve, a pressure control valve, a remotely operated valve, or a manually operated valve.

Figure 11:
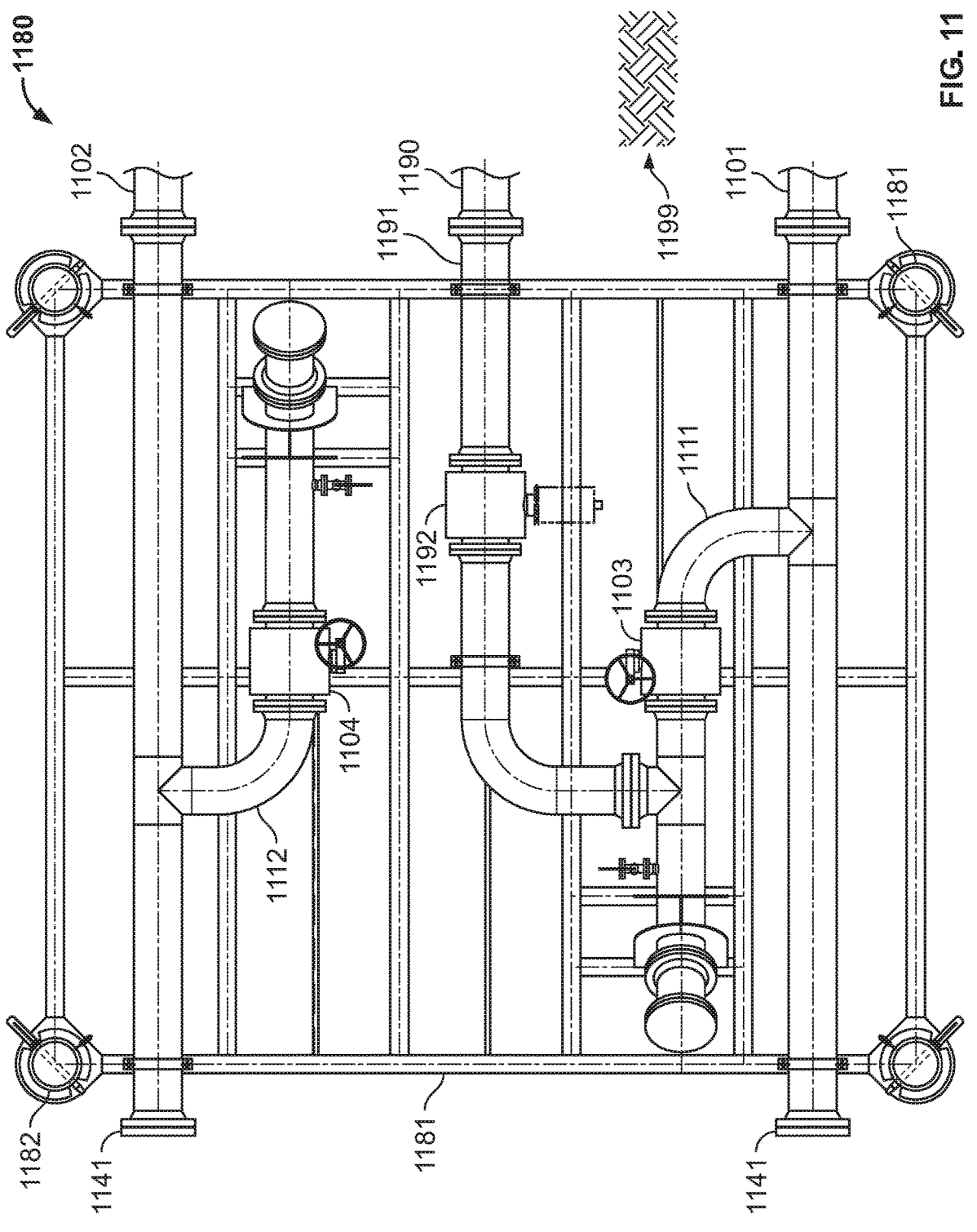
FIG. 11 depicts a plan view of another illustrative pipeline end manifold that can be configured to connect to a first subsea pipeline, a second subsea pipeline, and a third subsea pipeline disposed on a seabed, according to one or more embodiments described.

FIG. 11 depicts a plan view of another illustrative pipeline end manifold 1180 that can be configured to connect to a first subsea pipeline 1101, a second subsea pipeline 1102, and a third subsea pipeline 1190 disposed on a seabed 1199, according to one or more embodiments. In some embodiments, the pipeline end manifold 1180 can include a structural frame 1181 and can be configured to be secured to the seabed 1199 with at least one pile 1181, four are shown. In other embodiments, the pipeline end manifold 1180 can be secured to the seabed with gravity blocks (not shown).

In some embodiments, the pipeline end manifold 1180 can include a first rigid subsea conduit 1111, a second rigid subsea conduit 1112, and a third subsea conduit 1191. In some embodiments, the first rigid subsea conduit 1111, the second rigid subsea conduit 1112, and the third rigid conduit 1191 can each be configured with a valve 1103, 1104, 1192, respectively. In some embodiments, the valves 1103, 1104, and 1192 can independently be a diver operated valve, a valve operated via a remotely operated vehicle, or a remotely controlled valve. In some embodiments, the valves 1103, 1104, and 1192 can independently be a butterfly valve, a ball valve, or a gate valve.

Figure 12:
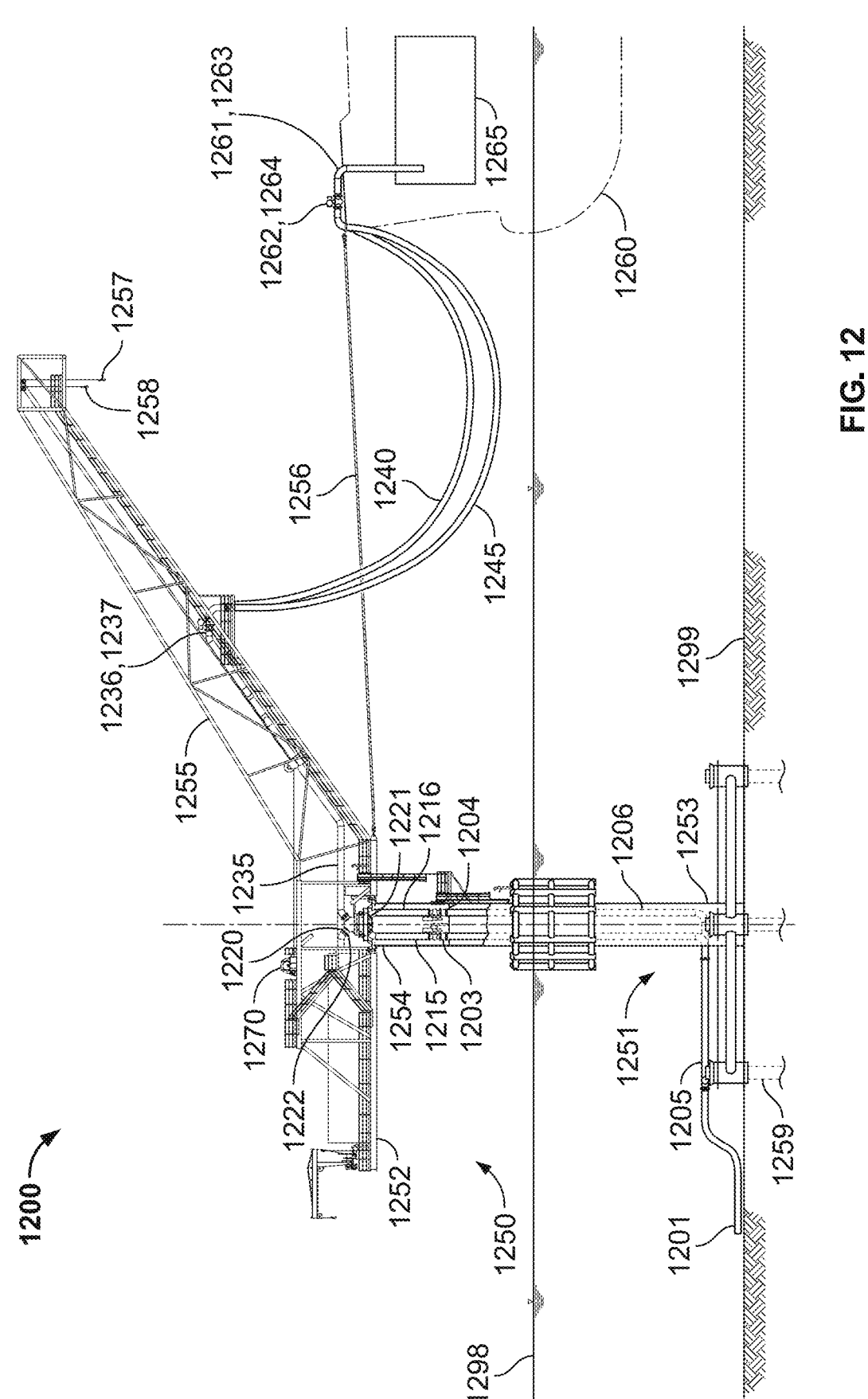
FIG. 12 depicts an elevation view of an illustrative fluid transfer system that includes a marine loading tower configured to transfer a fluid to and/or from a fluid storage tank that can be disposed on a vessel that can be moored to the fluid transfer system, according to one or more embodiments described.
Figure 13:
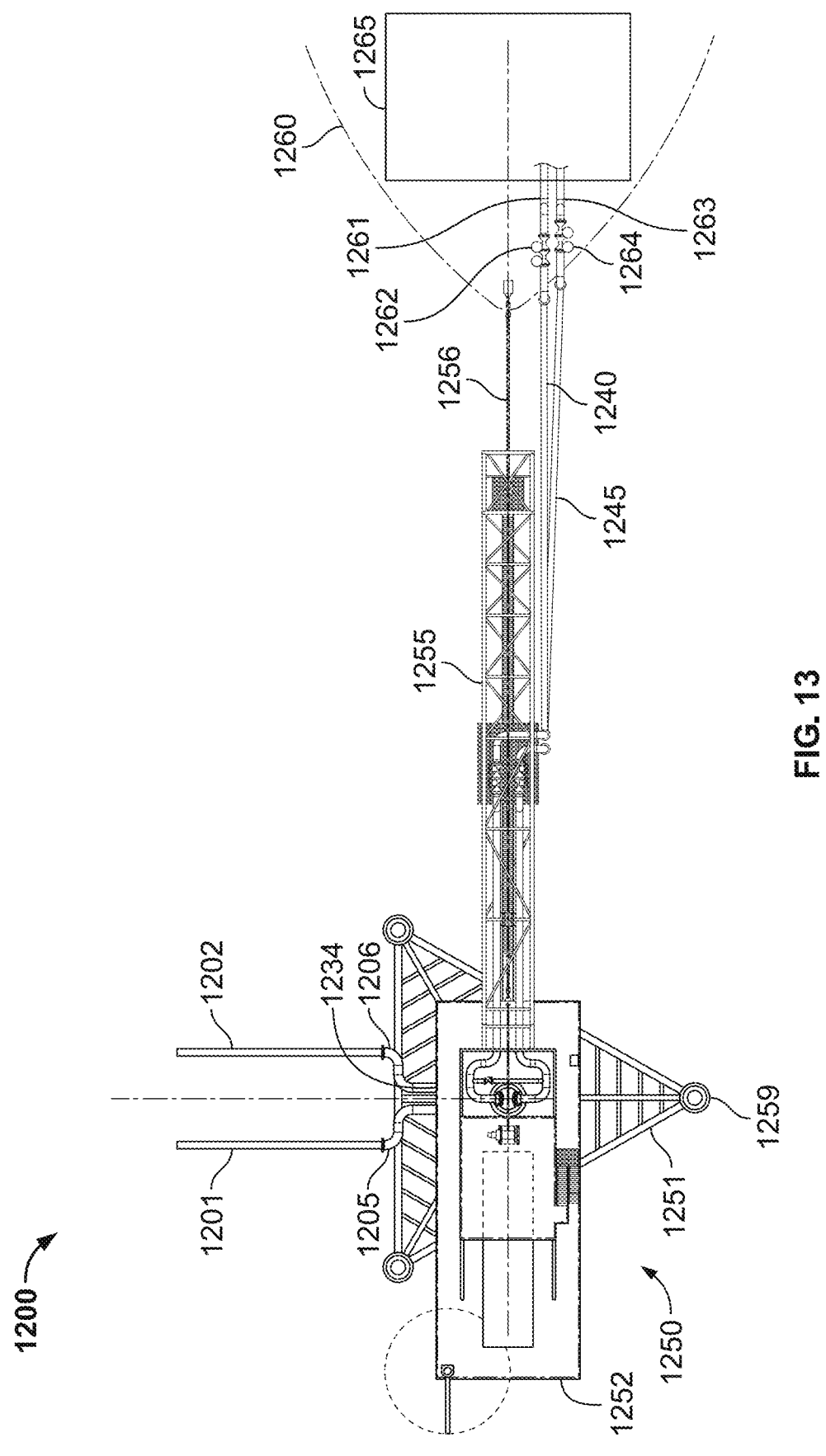
FIG. 13 depicts a plan view of the fluid transfer system shown in FIG. 12.
Figure 14:
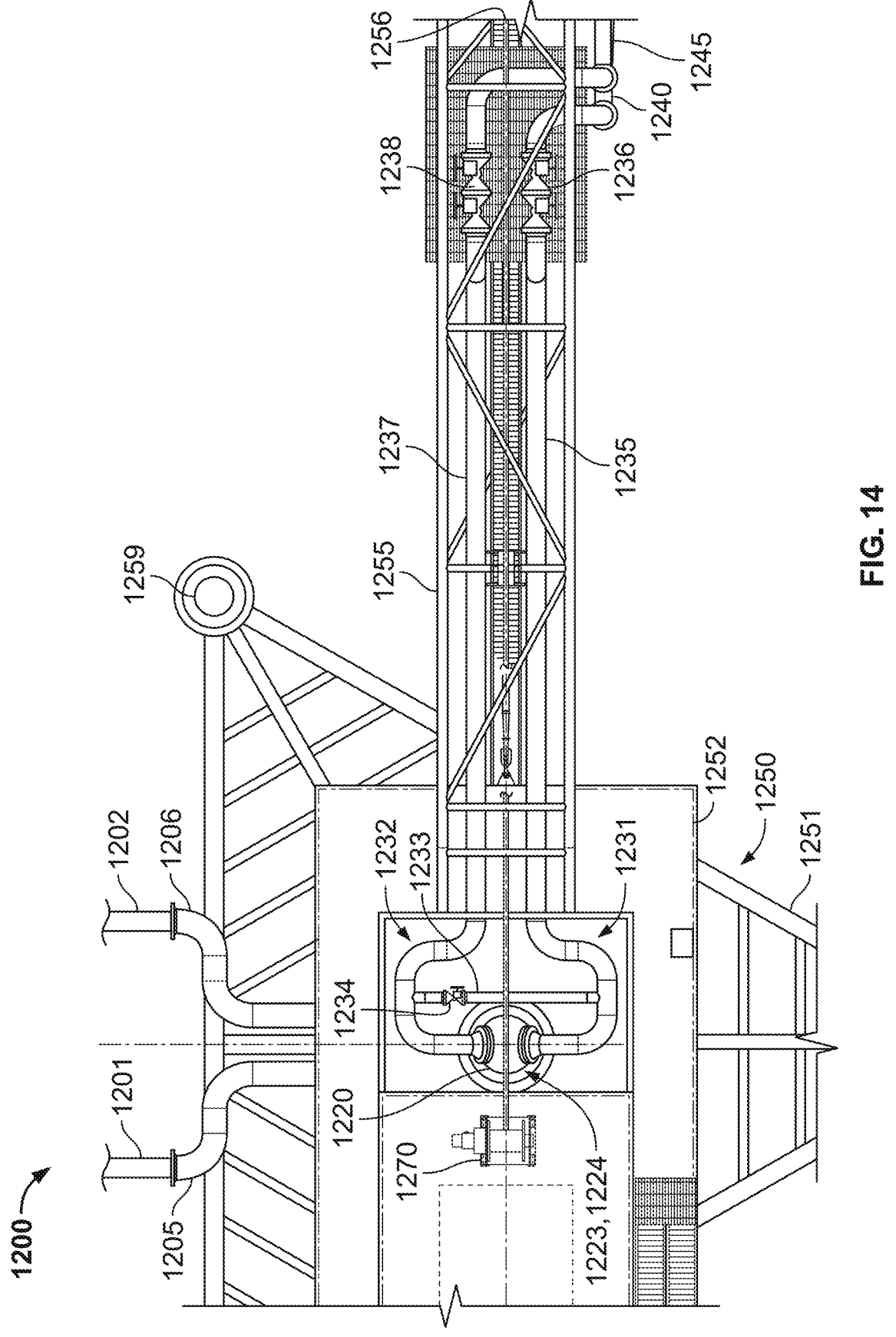
FIG. 14 depicts a close-up partial plan view of the fluid transfer system shown in FIGS. 12 and 13.

FIG. 12 depicts an elevation view of an illustrative fluid transfer system 1200 that includes a marine loading tower 1250 configured to transfer a fluid to and/or from a fluid storage tank 1265 that can be disposed on a vessel 1260 that can be moored to the fluid transfer system 1200, according to one or more embodiments. FIG. 13 depicts a plan view of the fluid transfer system 1200 shown in FIG. 12. FIG. 14 depicts a close-up partial plan view of the fluid transfer system 1200 shown in FIGS. 12 and 13. The system 1200 can include a first subsea conduit 1205, a second subsea conduit 1206, a first surface conduit 1231, a second surface conduit 1232, a crossover conduit 1233, a marine loading tower 1250 that can be fixed to a seabed 1299, and a mooring hawser 1256. In some embodiments, the first subsea conduit 1205 and the second subsea conduit 1206 can be rigid conduits. In some embodiments, the first subsea conduit 1205 and the second subsea conduit 1206 can each include a valve, 1203, 1204.

The marine loading tower 1250 can include a base 1251 rotatively coupled to a turntable 1252. In some embodiments, the base 1251 can include a first end 1253 fixedly attached to the seabed 1299 and a second end 1254 disposed above the surface of the body of water 1298. The first end 1253 of the base 1251 can be configured to be fixed to the seabed 1299. In some embodiments, the first end 1253 of the base 1251 can include a pile 1259, three are shown, configured to secure the first end 1253 of the base 1251 to the seabed 1299. In other embodiments, not shown, the first end 1253 of the base 1251 can be secured to the seabed 1299 via gravity blocks or weights.

The turntable 1252 of the marine loading tower 1250 can be rotatively coupled to the second end 1254 of the base 1251. A loading arm 1255 can be disposed on the turntable 1252. The marine loading tower 1250 can be configured to moor the vessel 1260 to the turntable 1252 and/or to the loading arm 1255. The marine loading tower 1250 can include a mooring hawser 1256 that can be configured to moor the vessel 1260 to the marine loading terminal 1250.

The marine loading tower 1250 can include a fluid swivel 1220. In some embodiments, the fluid swivel can define a first fluid flow path 1223 and a second fluid flow 1224 path therethrough. In other embodiments, the fluid swivel 1220 can define three or more fluid flow paths therethrough. The fluid swivel 1220 can include a fixed part 1221 rotatively coupled to a rotating part 1222. The fixed part 1221 of the fluid swivel 1220 can be coupled to the second end 1254 of the base 1251. The rotating part 1222 of the fluid swivel 1220 can be coupled to the turntable 1252. The fluid swivel 1220 can be configured to maintain the first fluid flow path 1223 separate or otherwise segregated from the second fluid path 1224 while the rotating part 1222 of the fluid swivel 1220 rotates relative to the fixed part 1221 of the fluid swivel 1220. The fluid swivel 1220 can be configured to maintain the first fluid flow path 1223 separate or otherwise segregated from the second fluid flow path 1224 while simultaneously maintaining fluid communication through the first fluid flow path 1223 of the fluid swivel 1220 and maintaining fluid communication through the second fluid flow path 1224 of the fluid swivel 1220 while the rotating part 1222 of the fluid swivel 1220 rotates relative to the fixed part 1221 of the fluid swivel 1220.

In some embodiments, the first surface conduit 1231 can be configured to provide fluid communication between the first fluid flow path 1223 defined by the fluid swivel 1220 and a loading pipe 1261 disposed the vessel 1260 and in fluid communication with the fluid storage tank 1265. The first surface conduit 1231 can include at least one valve 1236. In some embodiments, the valve 1236 can be disposed on the turntable 1252 or the loading arm 1255, as shown. In some embodiments, the valve 1236 can be a butterfly valve, a ball valve, or a gate valve. In some embodiments, the first surface conduit 1231 can include a first rigid conduit 1235 disposed on the turntable 1252 and optionally the loading arm 1255 that can be in fluid communication with a first flexible conduit 1240. In some embodiments, the first flexible conduit 1240 can be suspended from the loading arm 1255 via a wire, rope, cable, or other elongated body 1257 that can be connected to a winch 1270 when not fluidly connected to the loading pipe 1261 disposed on the vessel 1265. In some embodiments, the first flexible conduit 1240 and the loading pipe 1261 can include one or more valves 1262 therebetween. The valve 1262, if present, can be a butterfly valve, a ball valve, or a gate valve. In other embodiments, the first flexible conduit 1240 can be configured to float on or near the surface 1298 of the body of water.

In some embodiments, the second surface conduit 1232 can be configured to provide fluid communication between the second fluid path 1224 defined by the fluid swivel 1220 and a discharge pipe 1263 disposed on the vessel 1260 and in fluid communication with the fluid storage tank 1265. In some embodiments, the second surface conduit 1232 can be a rigid conduit. In some embodiments, the second surface conduit 1232 can be disposed on the turntable 1252. In some embodiments, the second surface conduit 1232 can include a second rigid conduit 1237 disposed on the turntable 1252 and optionally the loading arm 1255 that can be in fluid communication with a second flexible conduit 1245. In some embodiments, the second flexible conduit 1245 and the loading pipe 1263 can include one or more valves 1264 therebetween. In some embodiments, the second flexible conduit 1245 can be suspended from the loading arm 1255 via a wire, rope, cable, or other elongated body 1258 connected to the winch 1270 when not fluidly connected to the loading pipe 1263 disposed on the vessel 1265. In other embodiments, the second flexible conduit 1245 can be configured to float on or near the surface 1298 of the body of water.

The crossover conduit 1233 can be configured to fluidly connect the first surface conduit 1231 and the second surface conduit 1232. In some embodiments, the crossover conduit 1233 can be configured to fluidly connect the first rigid conduit 1235 with the second surface conduit 1232. In some embodiments, the crossover conduit 1233 can include a crossover valve 1234 such that fluid communication between the first rigid conduit 1235 and the second surface conduit 1232 via the crossover conduit 1233 can be allowed or prevented via the crossover valve 1234. In some embodiments, the crossover valve 1234 can be a pressure relief valve, a pressure control valve, a remote operated valve, or a manually operated valve.

In some embodiments, the marine loading tower 1250 can include a swivel inlet conduit 1215 disposed on the second end 1254 of the base 1251. The swivel inlet conduit 1215 can be configured to fluidly connect the first fluid flow path 1223 of the fluid swivel 1220 to the first subsea conduit 1205. In some embodiments, the marine loading tower 1250 can include a swivel outlet conduit 1216 disposed on the second end 1254 of the base 1251. The swivel outlet conduit 1216 can be configured to fluidly connect the second fluid flow path 1224 of the fluid swivel 1220 to the second subsea conduit 1206. In some embodiments, the inlet conduit 1215 and the outlet conduit 1216 can each be configured with a valve 1203, 1204. In some embodiments, the valves 1203, 1204 can be a butterfly valve, a ball valve, or a gate valve.

The present disclosure further relates to any one or more of the following numbered embodiments:

A1. A fluid transfer system, comprising: a mooring structure configured to be disposed in a body of water; a fluid swivel configured to be disposed on the mooring structure, wherein the fluid swivel comprises a fixed part rotatively coupled to a rotating part, and wherein the fixed part and the rotating part of the fluid swivel define a first fluid flow path and a second fluid flow path therethrough that are segregated from one another; a first subsea conduit configured to provide fluid communication between a first pipeline disposed on a seabed and the first fluid flow path defined by the fluid swivel; a second subsea conduit configured to provide fluid communication between a second pipeline disposed on the seabed and the second fluid flow path defined by the fluid swivel; a first surface conduit configured to fluidly connect a fluid storage tank disposed on a vessel and the first fluid flow path defined by the fluid swivel, wherein the first surface conduit comprises a valve; a second surface conduit in fluid communication with the second fluid flow path defined by the fluid swivel, wherein the second surface conduit comprises a valve; and a crossover conduit comprising a crossover valve, wherein the crossover conduit is configured to provide fluid communication between the first surface conduit and the second surface conduit, wherein: the fixed part of the fluid swivel and the rotating part of the fluid swivel are configured to maintain fluid communication between the first subsea conduit and the first surface conduit via the first fluid flow path, the fixed part of the fluid swivel and the rotating part of the fluid swivel are configured to maintain fluid communication between the second subsea conduit and the second surface conduit via the second fluid flow path; and the system is configured to transfer a fluid having a boiling point that is less than an ambient temperature at atmospheric pressure to or from the fluid storage tank.

A2. The system of A1, wherein the mooring structure comprises a fixed part rotatively coupled to a rotating part, and wherein the fixed part of the fluid swivel is coupled to the fixed part of the mooring structure.

A3. The system of A1 or A2, wherein the system is configured to transfer ammonia or liquid petroleum gas.

A4. The system of any one of A1 to A3, wherein the system is configured to limit a pressure within the first subsea conduit, the second subsea conduit, the first surface conduit, the crossover conduit, the second surface conduit, the first fluid flow path defined by the fluid swivel, and the second fluid flow path defined by the fluid swivel to less than 2,100 kPa-absolute.

A5. The system of any one of A2 to A4, wherein: the mooring structure is a catenary anchor leg mooring buoy configured to float on a surface of the body of water, the catenary anchor leg mooring buoy further comprises a mooring leg having a first end configured to be connected to the fixed part of the mooring structure and a second end configured to be connected to the seabed, and the catenary anchor leg mooring buoy is configured to moor the vessel to the rotating part of the mooring structure.

A6. The system of A5, wherein the first surface conduit comprises a first rigid conduit configured to be disposed on the rotating part of the mooring structure and a first floating conduit configured to float on the surface of the body of water in fluid communication with one another, and wherein the first floating conduit is configured to fluidly connect to the fluid storage tank.

A7. The system of A5 or A6, wherein the second surface conduit comprises a second rigid conduit configured to be disposed on the rotating part of the catenary anchor leg mooring buoy and a second floating conduit configured to float on or near the surface of the body of water in fluid communication with one another, and wherein the second floating conduit is configured to fluidly connect to the fluid storage tank.

A8. The system of A7, wherein: a first end of the first floating conduit is configured to be connected to the first rigid conduit and a second end of the first floating conduit is configured to float on or near the surface of the body of water, and a first end of the second floating conduit is configured to be connected to the second rigid conduit and a second end of the second floating conduit is configured to float on or near the surface of the body of water.

A9. The system of A8, wherein the crossover conduit is configured to be connected to the first rigid conduit and the second the rigid conduit, and wherein the crossover conduit is configured to be disposed on the rotating part of the buoy.

A10. The system of A9, wherein the crossover conduit is a first crossover conduit and the crossover valve is a first crossover valve, further comprising a second crossover conduit comprising a second crossover valve, wherein the second crossover conduit is configured to be connected to and provide fluid communication between the first floating conduit and the second floating conduit toward the second ends thereof.

A11. The system of A8, wherein the crossover conduit is configured to be connected to the first floating conduit toward the second end thereof and to the second floating conduit toward the second end thereof.

A12. The system of any one of A9 to A11, further comprising a subsea crossover conduit comprising a subsea crossover valve, wherein the subsea crossover conduit is configured to provide fluid communication between the first subsea conduit and the second subsea conduit.

A13. The system of any one of A5 to A12, wherein the first subsea conduit is arranged in a steep s configuration, a lazy s configuration, or a Chinese lantern configuration.

A14. The system of any one of A5 to A13, wherein the second subsea conduit is configured in a steep s configuration, a lazy s configuration, or a Chinese lantern configuration.

A15. The system of any one of A5 to A14, wherein the catenary anchor leg mooring buoy is a turntable buoy or a turret buoy.

A16. The system of any one of A5 to A15, wherein the crossover valve, the second crossover valve if present, or the subsea crossover valve if present are independently configured as a pressure relief valve, a pressure control valve, a remote operated valve, or a manually operated valve.

A17. The system of any one of A1 to A16, wherein the system is configured to convey the fluid as a liquid, a boil-off gas, or a combination thereof.

A18. The system of any one of A1 to A17, wherein the system is configured to convey the fluid through the first subsea conduit, the fluid swivel, the first surface conduit, and into the fluid storage tank disposed on the vessel.

A19. The system of any one of A1 to A17, wherein the system is configured to convey the fluid through the first subsea conduit, the first fluid flow path defined by the fluid swivel, a portion of the first surface conduit, the crossover conduit, at least a portion of the second surface conduit, the second fluid flow path defined by the fluid swivel, the second subsea conduit and into second subsea pipeline.

A20. The system of any one of A2 to A4, wherein the mooring structure is a marine loading tower, wherein: the fixed part of the mooring structure is a base having a first end fixed to the seabed and a second end disposed above a surface of the body of water, the rotating part of the mooring structure comprises a turntable, and the marine loading tower further comprises a loading arm disposed on the turntable, wherein the marine loading tower is configured to moor a vessel to the rotating part of the turntable the loading arm, or a combination thereof.

A21. The system of A20, wherein the first surface conduit comprises a first rigid surface conduit configured to be disposed on the turntable and the loading arm, and a first flexible conduit configured to be suspended from the loading arm in fluid communication with one another, and wherein the first flexible conduit is configured to fluidly connect to the fluid storage tank.

A22. The system of A20 or A21, wherein the second surface conduit comprises a second rigid surface conduit configured to be disposed on the turntable and the loading arm and a second flexible conduit configured to be suspended from the loading arm in fluid communication with one another, and wherein the second floating conduit is configured to fluidly connect to the fluid storage tank.

A23. The system of A22, wherein: a first end of the first flexible conduit is configured to be connected to the first rigid conduit and a second end of the first flexible conduit is configured to be suspended from the loading arm, and a first end of the second flexible conduit is configured to be connected to the second rigid conduit and a second end of the second flexible conduit is configured to be suspended from the loading arm.

A24. The system of A22 or A23, wherein the crossover conduit is configured to be connected to the first rigid surface conduit and to the second rigid surface conduit, and wherein the crossover conduit is configured to be disposed on the turntable and/or the loading arm.

A25. The system of A24, wherein the crossover conduit is a first crossover conduit and the crossover valve is a first crossover valve, further comprising a second crossover conduit comprising a second crossover valve, wherein the second crossover conduit is configured to be connected to and provide fluid communication between the first flexible conduit and the second flexible conduit toward the second ends thereof.

A26. The system of A23, wherein the crossover conduit is configured to be connected to the first flexible conduit toward the second end thereof and to the second flexible conduit toward the second end thereof.

A27. The system of any one of A20 to A26, wherein the crossover valve, the first crossover valve, and/or the second crossover valve if present, are each individually configured as a pressure relief valve, a pressure control valve, a remote operated valve, or a manually operated valve.

A28. The system of any one of A20 to A27, wherein the system is configured to convey the fluid as a liquid, a boil-off gas, or a combination thereof.

A29. The system of any one of A20 to A27, wherein the system is configured to convey the fluid through the first subsea conduit, the fluid swivel, the first surface conduit, and into the fluid storage tank disposed on the vessel.

A30. The system of any one of A20 to A27, wherein the system is configured to convey the fluid through the first subsea conduit, the first fluid flow path defined by the fluid swivel, a portion of the first surface conduit, the crossover conduit, at least a portion of the second surface conduit, the second fluid flow path defined by the fluid swivel, the second subsea conduit, and into the second subsea pipeline.

B1. A fluid transfer system, comprising: a mooring structure configured to be disposed in a body of water; a fluid swivel configured to be disposed on the mooring structure, wherein the fluid swivel comprises a fixed part rotatively coupled to a rotating part, and wherein the fixed part and the rotating part of the fluid swivel define a fluid flow path therethrough; a first subsea conduit configured to provide fluid communication between a first pipeline disposed on a seabed and the fluid flow path defined by the fluid swivel; a second subsea conduit configured to be in fluid communication with a second pipeline disposed on the seabed; a surface conduit configured to fluidly connect a fluid storage tank disposed on a vessel and the fluid flow path defined by the fluid swivel, wherein the surface conduit comprises a valve; and a crossover conduit comprising a crossover valve, wherein, the fixed part of the fluid swivel is coupled to the mooring structure, the crossover conduit is configured to provide fluid communication between the first subsea conduit and the second subsea conduit; the flow path defined by the fluid swivel is configured to maintain fluid communication between the first subsea conduit and the surface conduit; and the system is configured to transfer a fluid having a boiling point that is less than an ambient temperature at atmospheric pressure to or from the fluid storage tank.

B2. The system of B1, wherein the mooring structure comprises a fixed part rotatively coupled to a rotating part, and wherein the fixed part of the fluid swivel is coupled to the fixed part of the mooring structure.

B3. The system of B1 or B2, wherein the fluid comprises ammonia or one or more hydrocarbons.

B4. The system of any one of B1 to B3, wherein the system is configured to limit a pressure within the first subsea conduit, the second subsea conduit, the first surface conduit, the crossover conduit, the second surface conduit, and the flow path defined by the fluid swivel to less than 2,100 kPa-absolute.

B5. The system of any one of B2 to B4, wherein the mooring structure is a catenary anchor leg mooring buoy floating on a surface of the body of water, wherein: the catenary anchor leg mooring buoy further comprises a mooring leg having a first end configured to be connected to the fixed part of the mooring structure and a second end configured to be connected to the seabed, and the catenary anchor leg mooring buoy is configured to moor the vessel to the rotating part of the mooring structure.

B6. The system of B5, wherein the surface conduit comprises a rigid conduit disposed on the rotating part of the catenary anchor leg mooring buoy and a floating conduit configured to float on or near the surface of the body of water in fluid communication with one another.

B7. The system of B5 or B6, wherein the first subsea conduit is arranged in a steep s configuration, a lazy s configuration, or a Chinese lantern configuration.

B8. The system of any one of B5 to B7, wherein the catenary anchor leg mooring buoy is a turntable buoy or a turret buoy.

B9. The system of any one of B1 to B8, wherein the system is configured to convey the fluid as a liquid, a boil-off gas, or a combination thereof.

B10. The system of any one of B2 to B4, wherein the mooring structure is a marine loading tower, wherein: the fixed part of the mooring structure comprises a base having a first end fixed to the seabed and a second end disposed above the surface of the body of water; the rotating part of the mooring structure comprises a turntable, the marine loading tower further comprises a loading arm disposed on the turntable, and the marine loading tower is configured to moor a vessel to the rotating part of the turntable the loading arm, or a combination thereof.

B11. The system of B10, wherein the surface conduit comprises a rigid surface conduit configured to be disposed on the turntable and the loading arm, and a flexible conduit configured to be suspended from the loading arm in fluid communication with one another, and wherein the flexible conduit is configured to fluidly connect to the fluid storage tank.

B12. The system of B11, wherein a first end of the flexible conduit is configured to be connected to the rigid surface conduit and a second end of the flexible conduit is configured to be suspended from the loading arm.

B13. The system of B12, wherein the crossover conduit is configured to be disposed on the base toward the first end thereof.

B14. The system of any one of B10 to B13, wherein the crossover valve is configured as a pressure relief valve, a pressure control valve, a remote operated valve, or a manually operated valve.

B15. The system of any one of B10 to B14, wherein the system is configured to convey the fluid as a liquid, a boil-off gas, or a combination thereof.

B16. The system of any one of B10 to B14, wherein the system is configured to convey the fluid through the first subsea conduit, fluid flow path defined by the fluid swivel, the surface conduit, and into the fluid storage tank disposed on the vessel.

B17. The system of any one of B10 to B14, wherein the system is configured to convey the fluid through a portion of the first subsea conduit, the crossover conduit, a portion of the second subsea conduit, and into the second pipeline.

C1. A process for transferring a fluid, comprising: mooring a vessel to a mooring structure disposed in a body of water, wherein the mooring structure comprises: a fluid swivel disposed on the mooring structure, wherein the fluid swivel comprises a fixed part rotatively coupled to a rotating part, and wherein the fixed part and the rotating part of the fluid swivel define a first fluid flow path and a second fluid flow path therethrough that are segregated from one another; a first subsea conduit in fluid communication with a first pipeline disposed on a seabed and the first fluid low path defined by the fluid swivel; a second subsea conduit in fluid communication with a second pipeline disposed on the seabed and the second fluid flow path defined by the fluid swivel; a first surface conduit in fluid communication with the first fluid flow path defined by the fluid swivel, wherein the first surface conduit is configured to fluidly connect to a fluid storage tank disposed on the vessel, and wherein the first surface conduit comprises a valve; a second surface conduit in fluid communication with the second fluid flow path defined by the fluid swivel, wherein the second surface conduit is configured to fluidly connect to the fluid storage tank, and wherein the second surface conduit comprises a valve; and a crossover conduit comprising a crossover valve, wherein the crossover conduit is in fluid communication with the first surface conduit and the second surface conduit, wherein: the fixed part of the fluid swivel is coupled to the mooring structure; the fixed part of the fluid swivel and the rotating part of the fluid swivel maintain fluid communication between the first subsea conduit and the first surface conduit via the first fluid flow path, and the fixed part of the fluid swivel and the rotating part of the fluid swivel maintain fluid communication between the second subsea conduit and the second surface conduit via the second fluid flow path; connecting the first surface conduit to the fluid storage tank disposed on the vessel; closing the valve of the first surface conduit; opening the crossover valve; flowing the fluid from the first subsea pipeline, through the first subsea conduit, the first fluid flow path defined by fluid swivel, at least a portion of the first surface conduit, the crossover conduit, at least a portion of the second surface conduit, the second fluid flow path defined by the fluid swivel, the second subsea conduit and into the second subsea pipeline, wherein the fluid has a boiling point that is less than an ambient temperature at atmospheric pressure; closing the crossover valve; opening the valve of the first surface conduit; flowing the fluid from the first subsea pipeline, through the first subsea conduit, through the first fluid flow path defined by the fluid swivel, through the first surface conduit and into the fluid storage tank disposed on the vessel; closing the valve of the first surface conduit; and opening the crossover valve.

C2. The process of C1, further comprising, prior to flowing the fluid, flowing an inert gas from the first subsea pipeline, through the first subsea conduit, through the first fluid flow path defined by the fluid swivel, through the at least a portion of the first surface conduit, through the crossover conduit, through the at least a portion of the second surface conduit, through the second fluid flow path defined by the fluid swivel, through the second subsea conduit and into the second subsea pipeline; and stopping the flow of the inert gas.

C3. The process of C1 or C2, wherein re-opening the crossover valve after the valve of the first surface conduit is closed allows at least a portion of any boil-off vapor to flow into the second subsea pipeline.

C4. The process of any one of C1 to C3, wherein the mooring structure is a marine loading tower or a catenary anchor leg mooring buoy.

D1. A process for transferring a fluid, comprising: mooring a vessel to a mooring structure disposed in a body of water, wherein the mooring structure comprises: a fluid swivel disposed on the mooring structure, wherein the fluid swivel comprises a fixed part rotatively coupled to a rotating part, and wherein the fixed part and the rotating part of the fluid swivel define a fluid flow path therethrough; a first subsea conduit in fluid communication with a first pipeline disposed on a seabed and the fluid flow path defined by the fluid swivel, wherein the first subsea conduit comprises a valve; a second subsea conduit in fluid communication with a second pipeline disposed on the seabed; a surface conduit in fluid communication with a fluid storage tank disposed on a vessel and the flow path defined by the fluid swivel, wherein the surface conduit comprises a valve; and a crossover conduit comprising a crossover valve, wherein: the fixed part of the fluid swivel is coupled to the mooring structure, the crossover conduit is in fluid communication with the first subsea conduit and the second subsea conduit; and the fluid flow path defined by the fluid swivel is configured to maintain fluid communication between the first subsea conduit and the surface conduit; closing the valve of the first subsea conduit; opening the crossover valve; flowing the fluid from the first subsea pipeline, through at least a portion of first subsea conduit, through the crossover valve, through the second subsea conduit, through the second subsea conduit, and into the second pipeline; closing the crossover valve; opening the valve of the first subsea conduit and the valve of the surface conduit; flowing the fluid from the first subsea pipeline, through the first subsea conduit, through the flow path defined by the fluid swivel, through the first surface conduit, and into the storage tank disposed on the vessel; closing the valve of the first surface conduit; and re-opening the crossover valve.

D2. The process of D1, further comprising, prior to flowing the fluid, flowing an inert gas from the first subsea pipeline, through at least a portion of the first subsea conduit, through the crossover conduit, through the second subsea conduit, and into the second subsea pipeline; and stopping the flow of the inert gas.

D3. The process of D1 or D2, wherein re-opening the crossover valve after the valve of the first surface conduit is closed allows at least a portion of any boil-off vapors to flow through the second subsea conduit and into the second subsea pipeline.

D4. The process of any one of D1 to D3, wherein the mooring structure is a marine loading tower or a catenary anchor leg mooring buoy.

E1. A fluid transfer system, comprising: a mooring structure configured to be disposed in a body of water, wherein the mooring structure comprises a fixed part rotatively coupled to a rotating part; a fluid swivel configured to be disposed on the mooring structure, wherein the fluid swivel comprises a fixed part rotatively coupled to a rotating part, and wherein the fixed part and the rotating part of the fluid swivel define a first fluid flow path and a second fluid flow path therethrough that are segregated from one another, and wherein the fixed part of the fluid swivel is coupled to the fixed part of the mooring structure; a first subsea conduit configured to provide fluid communication between a first pipeline disposed on a seabed and the first fluid flow path defined by the fluid swivel; a second subsea conduit configured to provide fluid communication between a second pipeline disposed on the seabed and the second fluid flow path defined by the fluid swivel; a first surface conduit configured to fluidly connect a fluid storage tank disposed on a vessel and the first fluid flow path defined by the fluid swivel, wherein the first surface conduit comprises a valve; a second surface conduit configured to fluidly connect the fluid storage tank and the second fluid flow path defined by the fluid swivel, wherein the second surface conduit comprises a valve; and a crossover conduit comprising a crossover valve, wherein the crossover conduit is configured to provide fluid communication between (i) the first surface conduit and the second surface conduit, (ii) the first subsea conduit and the second subsea conduit, or (iii) the first subsea conduit and an optional third pipeline disposed on the seabed, wherein: the fixed part of the fluid swivel and the rotating part of the fluid swivel are configured to maintain fluid communication between the first subsea conduit and the first surface conduit via the first fluid flow path, the fixed part of the fluid swivel and the rotating part of the fluid swivel are configured to maintain fluid communication between the second subsea conduit and the second surface conduit via the second fluid flow path; and the system is configured to transfer a fluid having a boiling point that is less than an ambient temperature at atmospheric pressure to or from the fluid storage tank.

E2. The system of E1, wherein the first surface conduit is configured to fluidly connect to a loading pipe disposed on the vessel that is configured to be in fluid communication with the fluid storage tank, the second surface conduit is configured to fluidly connect to a discharge pipe disposed on the vessel that is configured to be in fluid communication with the fluid storage tank, and the crossover conduit is disposed on the vessel and is configured to be in fluid communication with the loading pipe and the discharge pipe to provide the fluid communication between the first surface conduit and the second surface conduit when the crossover valve is in an open position.

E3. The system of E2, wherein the loading pipe and the discharge pipe each include at least one valve between the fluid storage tank and the crossover conduit.

E4. The system of E3, wherein the at least one valve of the loading pipe and the at least one valve of the discharge pipe are configured to be in a closed position when the crossover valve is in an open position to provide the fluid communication between the first surface conduit and the second surface conduit.

E5. The system of any one of E1 to E4, wherein: the mooring structure is a catenary anchor leg mooring buoy configured to float on a surface of the body of water, the system further comprises a mooring leg having a first end configured to be connected to the fixed part of the mooring structure and a second end configured to be connected to the seabed, and the catenary anchor leg mooring buoy is configured to moor the vessel to the rotating part of the mooring structure.

E6. The system of any one of E1 to E4, wherein the mooring structure is a marine loading tower, wherein: the fixed part of the mooring structure comprises a base having a first end fixed to the seabed and a second end disposed above a surface of the body of water, the rotating part of the mooring structure comprises a turntable, and the marine loading tower further comprises a loading arm disposed on the turntable, wherein the marine loading tower is configured to moor a vessel to the rotating part of the turntable or the loading arm.

E7. The system of any one of E1 to E6, wherein the system is configured to transfer ammonia or liquid petroleum gas.

E8. The system of any one of E1 to E7, wherein the system is configured to limit a pressure within the first subsea conduit, the second subsea conduit, the first surface conduit, the crossover conduit, the second surface conduit, the first fluid flow path defined by the fluid swivel, and the second fluid flow path defined by the fluid swivel to less than 2,100 kPa-absolute.

E9. The system of any one of E1 to E8, wherein the crossover conduit is configured to provide fluid communication between the first surface conduit and the second surface conduit.

E10. The system of any one of E1 to E8, wherein the crossover conduit is configured to provide fluid communication between the first subsea conduit and the second subsea conduit.

E11. The system of any one of E1 to E8, wherein the optional third pipeline is present, and wherein the crossover conduit is configured to provide fluid communication between the first subsea conduit and the third pipeline.

E12. The system of any one of E1 to E8, wherein the crossover conduit is a first crossover conduit comprising a first crossover valve, the system further comprising a second crossover conduit comprising a second crossover valve, wherein the first crossover conduit is configured to provide fluid communication between the first surface conduit and the second surface conduit and the second crossover conduit is configured to provide fluid communication between the first subsea conduit and the second subsea conduit or the first subsea conduit and the optional third pipeline disposed on the seabed.

E13. The system of any one of E1 to E8, wherein the crossover conduit is a first crossover conduit comprising a first crossover valve and the third pipeline is present, the system further comprising a second crossover conduit comprising a second crossover valve and a third crossover conduit comprising a third crossover valve, wherein the first crossover conduit is configured to provide fluid communication between the first surface conduit and the second surface conduit, the second crossover conduit is configured to provide fluid communication between the first subsea conduit and the second subsea conduit, and the third crossover conduit is configured to provide fluid communication between the first subsea conduit and the third pipeline.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A fluid transfer system, comprising:
a catenary anchor leg mooring buoy configured to float on a surface of a body of water, wherein:
the catenary anchor leg mooring buoy comprises a fixed part rotatively coupled to a rotating part,
the catenary anchor leg mooring buoy comprises a mooring leg comprising a chain, and the mooring leg has a first end configured to be connected to the fixed part of the catenary anchor leg mooring buoy and a second end configured to be connected to a seabed;
a fluid swivel configured to be disposed on the catenary anchor leg mooring buoy, wherein the fluid swivel comprises a fixed part rotatively coupled to a rotating part, wherein the fixed part and the rotating part of the fluid swivel define a first fluid flow path and a second fluid flow path therethrough that are segregated from one another, and wherein the fixed part of the fluid swivel is coupled to the fixed part of the catenary anchor leg mooring buoy;
a first subsea conduit configured to provide fluid communication between a first pipeline disposed on the seabed and the first fluid flow path defined by the fluid swivel;
a second subsea conduit configured to provide fluid communication between a second pipeline disposed on the seabed and the second fluid flow path defined by the fluid swivel;
a first surface conduit configured to fluidly connect a fluid storage tank disposed on a vessel and the first fluid flow path defined by the fluid swivel, wherein the first surface conduit comprises a valve;
a second surface conduit configured to fluidly connect the fluid storage tank and the second fluid flow path defined by the fluid swivel, wherein the second surface conduit comprises a valve; and
a crossover conduit comprising a crossover valve, wherein the crossover conduit is configured to provide fluid communication between (i) the first surface conduit and the second surface conduit, (ii) the first subsea conduit and the second subsea conduit, or (iii) the first subsea conduit and an optional third pipeline disposed on the seabed, wherein:
the fixed part of the fluid swivel and the rotating part of the fluid swivel are configured to maintain fluid communication between the first subsea conduit and the first surface conduit via the first fluid flow path,
the fixed part of the fluid swivel and the rotating part of the fluid swivel are configured to maintain fluid communication between the second subsea conduit and the second surface conduit via the second fluid flow path,
the system is configured to transfer a fluid having a boiling point that is less than an ambient temperature at atmospheric pressure to or from the fluid storage tank, and
the catenary anchor leg mooring buoy is configured to moor the vessel to the rotating part of the catenary anchor leg mooring buoy.

2. The system of claim 1, wherein the first surface conduit comprises a first rigid conduit disposed on the rotating part of the catenary anchor leg mooring buoy and a first floating conduit configured to float on or near the surface of the body of water in fluid communication with one another, and wherein the first floating conduit is configured to fluidly connect to the fluid storage tank.

3. The system of claim 2, wherein:
the second surface conduit comprises a second rigid conduit configured to be disposed on the rotating part of the catenary anchor leg mooring buoy and a second floating conduit configured to float on or near the surface of the body of water in fluid communication with one another,
the second floating conduit is configured to fluidly connect to the fluid storage tank, a first end of the first floating conduit is configured to be connected to the first rigid conduit and a second end of the first floating conduit is configured to float on or near the surface of the body of water when not in fluid communication with the fluid storage tank, a first end of the second floating conduit is configured to be connected to the second rigid conduit and a second end of the second floating conduit is configured to float on or near the surface of the body of water when not in fluid communication with the fluid storage tank, and the crossover conduit is configured to be connected to the first rigid conduit and to the second the rigid conduit or to the first floating conduit and to the second floating conduit.

4. The system of claim 3, wherein the crossover conduit is a first crossover conduit and the crossover valve is a first crossover valve and the first crossover conduit is configured to be connected to the first rigid conduit and to the second rigid conduit, the system further comprising a second crossover conduit comprising a second crossover valve, wherein the second crossover conduit is configured to be connected to and provide fluid communication between the first floating conduit and the second floating conduit toward the second ends thereof.

5. The system of claim 3, wherein the crossover conduit is configured to be directly connected to the first floating conduit toward the second end thereof and configured to be directly connected to the second floating conduit toward the second end thereof.

6. The system of claim 1, wherein the first surface conduit and the second surface conduit are configured to fluidly connect the fluid storage tank to the rotating part of the fluid swivel when the crossover valve is in a closed position.

7. The system of claim 1, wherein:

the first subsea conduit is configured to provide fluid communication between the first pipeline and the fixed part of the fluid swivel, the second subsea conduit is configured to provide fluid communication between the second pipeline and the fixed part of the fluid swivel, the first surface conduit is configured to fluidly connect the fluid storage tank to the rotating part of the fluid swivel, and the second surface conduit is configured to fluidly connect the fluid storage tank to the rotating part of the fluid swivel.

8. The system of claim 1, wherein:

the system is configured to transfer the fluid in a liquid state from the first pipeline to the fluid storage tank via the first subsea conduit, the first fluid flow path defined by the fluid swivel, and the first surface conduit, and the system is configured to transfer the fluid in a gaseous state from the fluid storage tank to the second pipeline via the second surface conduit, the second fluid flow path defined by the fluid swivel, and the second subsea conduit.

9. The system of claim 1, wherein, when the catenary anchor leg mooring buoy is floating on the surface of the body of water, the mooring leg has a catenary configuration when connected to the fixed part of the catenary anchor leg mooring buoy and the seabed.

10. The system of claim 1, wherein:

the first subsea conduit is configured as a flexible conduit or as a combination of one or more rigid conduits and one or more flexible conduits, and the second subsea conduit is configured as a flexible conduit or as a combination of one or more rigid conduits and one or more flexible conduits.

11. The system of claim 1, wherein:

the first subsea conduit is configured in a Chinese lantern configuration, a Steep S configuration, a Steep Wave configuration, a Lazy S configuration, or a Lazy Wave configuration between the catenary anchor leg mooring buoy and the first pipeline, and the second subsea conduit is configured in a Chinese lantern configuration, a Steep S configuration, a Steep Wave configuration, a Lazy S configuration, or a Lazy Wave configuration between the catenary anchor leg mooring buoy and the second pipeline.

12. The system of claim 1, wherein:

the system transfers the fluid in a liquid state from the first pipeline to the fluid storage tank via the first subsea conduit, the first fluid flow path defined by the fluid swivel, and the first surface conduit, and the system transfers the fluid in a gaseous state from the fluid storage tank to the second pipeline via the second surface conduit, the second fluid flow path defined by the fluid swivel, and the second subsea conduit.

13. The system of claim 12, wherein the fluid comprises refrigerated ammonia in a liquid state, refrigerated carbon dioxide in a liquid state, or refrigerated liquified petroleum gas in a liquid state.

14. A fluid transfer system, comprising:

a catenary anchor leg mooring buoy configured to float on a surface of a body of water, wherein:

the catenary anchor leg mooring buoy comprises a fixed part rotatively coupled to a rotating part, and the catenary anchor leg mooring buoy has a first end configured to be connected to the fixed part of the catenary anchor leg mooring buoy and a second end configured to be connected to a seabed;

a fluid swivel configured to be disposed on the catenary anchor leg mooring buoy, wherein the fluid swivel comprises a fixed part rotatively coupled to a rotating part, wherein the fixed part and the rotating part of the fluid swivel define a first fluid flow path and a second fluid flow path therethrough that are segregated from one another, and wherein the fixed part of the fluid swivel is coupled to the fixed part of the catenary anchor leg mooring buoy;

a first subsea conduit configured to provide fluid communication between a first pipeline disposed on the seabed and the first fluid flow path defined by the fluid swivel;

a second subsea conduit configured to provide fluid communication between a second pipeline disposed on the seabed and the second fluid flow path defined by the fluid swivel;

a first surface conduit configured to fluidly connect a fluid storage tank disposed on a vessel and the first fluid flow path defined by the fluid swivel, wherein the first surface conduit comprises a valve;

a second surface conduit configured to fluidly connect the fluid storage tank and the second fluid flow path defined by the fluid swivel and a crossover conduit comprising a crossover valve, wherein: the crossover conduit is configured to provide fluid communication between (i) the first surface conduit and the second surface conduit, or (ii) the first subsea conduit and the second subsea conduit, wherein: the fixed part of the fluid swivel and the rotating part of the fluid swivel are configured to maintain fluid communication between the first subsea conduit and the first surface conduit via the first fluid flow path, the fixed part of the fluid swivel and the rotating part of the fluid swivel are configured to maintain fluid communication between the second subsea conduit and the second surface conduit via the second fluid flow path, and the system is configured to transfer a fluid having a boiling point that is less than an ambient temperature at atmospheric pressure to or from the fluid storage tank.

15. The system of claim 14, wherein the mooring leg comprises a chain.

16. The system of claim 14, wherein the subsea conduit is configured in a Chinese lantern configuration, a Steep S configuration, a Steep Wave configuration, a Lazy S configuration, or a Lazy Wave configuration between the catenary anchor leg mooring buoy and the first pipeline.

17. The system of claim 16, wherein the mooring leg comprises a chain.

18. The system of claim 14, wherein:

the system transfers the fluid in a liquid state from the first pipeline to the fluid storage tank via the first subsea conduit, the first fluid flow path defined by the fluid swivel, and the first surface conduit, and the system transfers the fluid in a gaseous state from the fluid storage tank to the second pipeline via the second surface conduit, the second fluid flow path defined by the fluid swivel, and the second subsea conduit.

19. The system of claim 18, wherein the fluid comprises refrigerated ammonia in a liquid state, refrigerated carbon dioxide in a liquid state, or refrigerated liquified petroleum gas in a liquid state.

20. A process for transferring a fluid, comprising:

mooring a vessel to a catenary anchor leg mooring buoy floating on a surface of a body of water, wherein:

the catenary anchor leg mooring buoy comprises a fixed part rotatively coupled to a rotating part, the catenary anchor leg mooring buoy comprises a mooring leg comprising a chain, the mooring leg has a first end configured to be connected to the fixed part of the catenary anchor leg mooring buoy and a second end configured to be connected to a seabed, the vessel is moored to the rotating part of the catenary anchor leg mooring buoy, and a fluid swivel is disposed on the catenary anchor leg mooring buoy, wherein the fluid swivel comprises a fixed part rotatively coupled to a rotating part, and wherein the fixed part and the rotating part of the fluid swivel define a first fluid flow path and a second fluid flow path therethrough that are segregated from one another;

a first subsea conduit in fluid communication with a first subsea pipeline disposed on the seabed and the first fluid flow path defined by the fluid swivel;

a second subsea conduit in fluid communication with a second subsea pipeline disposed on the seabed and the second fluid flow path defined by the fluid swivel;

a first surface conduit in fluid communication with the first fluid flow path defined by the fluid swivel, wherein the first surface conduit is configured to fluidly connect to a fluid storage tank disposed on the vessel, and wherein the first surface conduit comprises a valve;

a second surface conduit in fluid communication with the second fluid flow path defined by the fluid swivel, wherein the second surface conduit is configured to fluidly connect to the fluid storage tank, and wherein the second surface conduit comprises a valve; and a crossover conduit comprising a crossover valve, wherein the crossover conduit is in fluid communication with the first surface conduit and the second surface conduit, wherein:

the fixed part of the fluid swivel is coupled to the catenary anchor leg mooring buoy, the fixed part of the fluid swivel and the rotating part of the fluid swivel maintain fluid communication between the first subsea conduit and the first surface conduit via the first fluid flow path, and the fixed part of the fluid swivel and the rotating part of the fluid swivel maintain fluid communication between the second subsea conduit and the second surface conduit via the second fluid flow path;

connecting the first surface conduit to the fluid storage tank disposed on the vessel;

closing the valve of the first surface conduit;

opening the crossover valve;

flowing the fluid from the first subsea pipeline, through the first subsea conduit, the first fluid flow path defined by the fluid swivel, at least a portion of the first surface conduit, the crossover conduit, at least a portion of the second surface conduit, the second fluid flow path defined by the fluid swivel, the second subsea conduit and into the second subsea pipeline, wherein the fluid has a boiling point that is less than an ambient temperature at atmospheric pressure;

closing the crossover valve;

opening the valve of the first surface conduit;

flowing the fluid from the first subsea pipeline, through the first subsea conduit, through the first fluid flow path defined by the fluid swivel, through the first surface conduit and into the fluid storage tank disposed on the vessel;

closing the valve of the first surface conduit; and re-opening the crossover valve.

21. The process of claim 20, further comprising:

prior to flowing the fluid, flowing an inert gas from the first subsea pipeline, through the first subsea conduit, through the first fluid flow path defined by the fluid swivel, through the at least a portion of the first surface conduit, through the crossover conduit, through the at least a portion of the second surface conduit, through the second fluid flow path defined by the fluid swivel, through the second subsea conduit and into the second subsea pipeline; and stopping the flow of the inert gas.

22. The process of claim 20, wherein re-opening the crossover valve after the valve of the first surface conduit is closed allows at least a portion of any boil-off vapor to flow into the second subsea pipeline.

23. The process of claim 20, further comprising:

connecting the second surface conduit to the fluid storage tank disposed on the vessel;

opening the valve of the second surface conduit; and flowing a gas from the fluid storage tank through the second surface conduit, through the second fluid flow path defined by the fluid swivel, through the second subsea conduit, and into the second subsea pipeline.

24. The process of claim 20, wherein the fluid comprises refrigerated ammonia in a liquid state, refrigerated carbon dioxide in a liquid state, or refrigerated liquified petroleum gas in a liquid state.

\* \* \* \* \*